United States Patent
Yamaguchi

(10) Patent No.: US 12,245,535 B2
(45) Date of Patent: Mar. 11, 2025

(54) COMBINE HARVESTER

(71) Applicant: Yanmar Holdings Co., Ltd., Osaka (JP)

(72) Inventor: Yuji Yamaguchi, Osaka (JP)

(73) Assignee: Yanmar Holdings Co., Ltd., Osaka (JP)

(*) Notice: Subject to any disclaimer, the term of this patent is extended or adjusted under 35 U.S.C. 154(b) by 132 days.

(21) Appl. No.: 17/925,030

(22) PCT Filed: May 7, 2021

(86) PCT No.: PCT/JP2021/017532
§ 371 (c)(1),
(2) Date: Nov. 14, 2022

(87) PCT Pub. No.: WO2021/246106
PCT Pub. Date: Dec. 9, 2021

(65) Prior Publication Data
US 2023/0172090 A1    Jun. 8, 2023

(30) Foreign Application Priority Data
Jun. 2, 2020   (JP) ................. 2020-095932

(51) Int. Cl.
*A01B 69/04* (2006.01)
*G05D 1/00* (2006.01)

(52) U.S. Cl.
CPC ......... *A01B 69/008* (2013.01); *G05D 1/0212* (2013.01)

(58) Field of Classification Search
CPC ..... A01B 69/00; A01B 69/007; A01B 69/008; A01D 41/1278; A01D 34/008; B60W 2300/158; G05D 1/0212; G05D 1/0219
See application file for complete search history.

(56) References Cited

U.S. PATENT DOCUMENTS

| | | | |
|---|---|---|---|
| 2017/0082442 A1* | 3/2017 | Anderson | A01B 69/007 |
| 2019/0021226 A1* | 1/2019 | Dima | A01D 34/008 |
| 2021/0144900 A1* | 5/2021 | Henry | A01B 63/245 |

FOREIGN PATENT DOCUMENTS

| | | |
|---|---|---|
| CN | 110209153 A | 9/2019 |
| JP | 2017136035 A | 8/2017 |
| JP | 2019028688 A | 2/2019 |
| JP | 2021007386 A | 1/2021 |

* cited by examiner

*Primary Examiner* — Kenneth J Malkowski
(74) *Attorney, Agent, or Firm* — Chris Mizumoto

(57) ABSTRACT

A combine harvester includes a control device, and the control device functions as a travel route creation section which creates a travel route corresponding to a field, and as an automatic driving control section which controls automatic travel and automatic reaping along the travel route. The control device also functions as a lodging information setting section which automatically or manually sets lodging information associated with a lodging region in which grain culms are lodged in the field. The travel route creation section creates, on the basis of the lodging information, the travel route that includes reaping of the grain culms in the lodging region.

5 Claims, 24 Drawing Sheets

COMBINE HARVESTER

CROSS-REFERENCE

This application is a national phase of an international application, PCT/JP2021/017532 filed on May 7, 2021, which claims the benefit of Japanese Application No. 2020-095932, filed on Jun. 2, 2020, all of which are incorporated by reference.

TECHNICAL FIELD

The present invention relates to a combine harvester that performs automatic travel and automatic reaping according to a travel route, the combine harvester creating the travel route according to a lodging state of a grain culm of a field.

BACKGROUND ART

Conventionally, a combine harvester that reaps grain culms while traveling in a field can perform automatic travel and automatic reaping according to a preset travel route based on position information of the combine harvester acquired using a satellite positioning system such as a GPS.

For example, in a harvest system of an autonomously traveling combine harvester disclosed in Patent Document 1, an electronic camera that projects a field is provided in an autonomous multicopter that flies in the sky in front of a machine body of a combine harvester that autonomously travels based on a reaping route input in advance, the multicopter flying on a flight route corresponding to the reaping route, and a field video projected by the electronic camera is transmitted to a main machine control section on the combine harvester side. The combine harvester performs video analysis of the field video by the main machine control section, forms a corrected reaping route that avoids a lodging region where an obstacle or grain culms are lodged to a predetermined extent or more, and autonomously travels according to the corrected reaping route.

In addition, in the farm work support system disclosed in Patent Document 2, the combine harvester enables a worker to input the lodging state of the grain culms, and performs automatic driving at a speed corresponding to the lodging state.

PRIOR ART DOCUMENT

Patent Document

Patent Document 1: JP-A-2019-28688
Patent Document 2: JP-A-2018-201342

SUMMARY OF INVENTION

Technical Problem

When a combine harvester harvests crops, there is a preferable reaping direction depending on a type of the crops and a lodging state of the grain culms. For example, in a case where the crops to be harvested are rice plants or wheats and the lodging angle of the grain culms is large, it is preferable to slowly harvest the crops by following reaping. In a conventional autonomous traveling combine harvester, since a travel route is automatically created based on a field shape, reaping corresponding to the travel route may be facing reaping in a lodging region where grain culms are lodged by a predetermined angle or more. In this manner, in the lodging region where the travel route corresponds to the facing reaping, it is difficult to perform automatic reaping.

Note that some combine harvesters perform automatic work of controlling steering by automatic driving and controlling speed in accordance with manual operation. However, in this automatic work, it is necessary to cope with manual operation such as bypassing the lodging region where the travel route corresponds to the facing reaping, by manual operation, or performing the following reaping by manual operation. In addition, some combine harvesters perform unmanned work for controlling steering and speed by automatic driving. In this unmanned work, it is possible to perform automatic reaping at a low speed with respect to the lodging region where the travel route corresponds to the facing reaping, but it is difficult to perform work accurately as compared with the following reaping.

In the technique described in Patent Document 1, a combine harvester can continue automatic driving while avoiding a lodging region, but cannot perform reaping in the lodging region. Therefore, it is necessary for the worker to manually drive the combine harvester in the lodging region, for example, to perform following reaping on the lodged rice plants or wheats, and it takes time and effort to switch between the automatic driving and the manual driving, and the manual driving is subjected to a burden.

In addition, in the technique described in Patent Document 2, the combine harvester can perform automatic driving at a speed corresponding to the lodging state, but cannot appropriately associate the lodging state with the reaping direction. Therefore, even in a case where the reaping direction is not suitable for the lodged crops, the automatic reaping is performed, and for example, even in a case where facing reaping is performed for the lodged rice plants or wheats, the automatic reaping is performed as it is. Thus, the lodged crops cannot be accurately reaped.

An object of the present invention is to provide a combine harvester capable of appropriately performing automatic driving even in a lodging region by creating a travel route according to a lodging state of a grain culm.

Solution to Problem

In order to solve the above problems, a combine harvester according to the present invention includes: a lodging information setting section that automatically or manually sets lodging information related to a lodging region where a grain culm is lodged in a field; a travel route creation section that creates, based on the lodging information, a travel route corresponding to the field, the travel route including reaping of the grain culm in the lodging region; and an automatic driving control section that controls automatic travel and automatic reaping according to the travel route.

In the combine harvester according to the present invention as described above, the lodging information setting section sets a lodging direction of the grain culm as the lodging information, and the travel route creation section creates the travel route to reap the grain culm in the lodging region in a predetermined recommended reaping direction with respect to the lodging direction.

In the combine harvester according to the present invention as described above, in a case where the reaping direction corresponding to the travel route in the lodging region is different from the recommended reaping direction based on the travel route and the lodging information, the travel route creation section determines a unidirectional reaping corresponding region including the lodging region, and corrects the travel route in a manner that the reaping direction in the unidirectional reaping corresponding region becomes the recommended reaping direction.

In the combine harvester according to the present invention as described above, the travel route creation section determines a lodging influence region in which traveling on the travel route is affected due to correction of the travel route in the unidirectional reaping corresponding region, based on the travel route and the lodging information, the lodging influence region is divided into the unidirectional reaping corresponding region and a unidirectional reaping unnecessary region other than the unidirectional reaping corresponding region, and a region that does not include the lodging region in the unidirectional reaping corresponding region is further divided as the unidirectional reaping unnecessary region, based on a position of the lodging region in the unidirectional reaping corresponding region.

The combine harvester according to the present invention as described above further includes a field information setting section that automatically sets field information related to the field based on a field image in which an image of the field has been captured, and the lodging information setting section automatically sets the lodging information based on the field image.

Advantageous Effects of Invention

According to the present invention, there is provided the combine harvester capable of appropriately performing the automatic driving even in the lodging region by creating the travel route according to the lodging state of the grain culm.

DESCRIPTION OF EMBODIMENTS

A combine harvester 1 according to an embodiment of the present invention will be described. The combine harvester 1 travels in a work target field by automatic driving or manual operation and performs work such as reaping of grain culms in the field. For example, the combine harvester 1 is configured to perform automatic work of controlling a traveling speed according to manual operation and unmanned work of controlling steering and a traveling speed by automatic driving while controlling steering by automatic driving, and can autonomously travel, turn, and work in the field.

Figure 1:
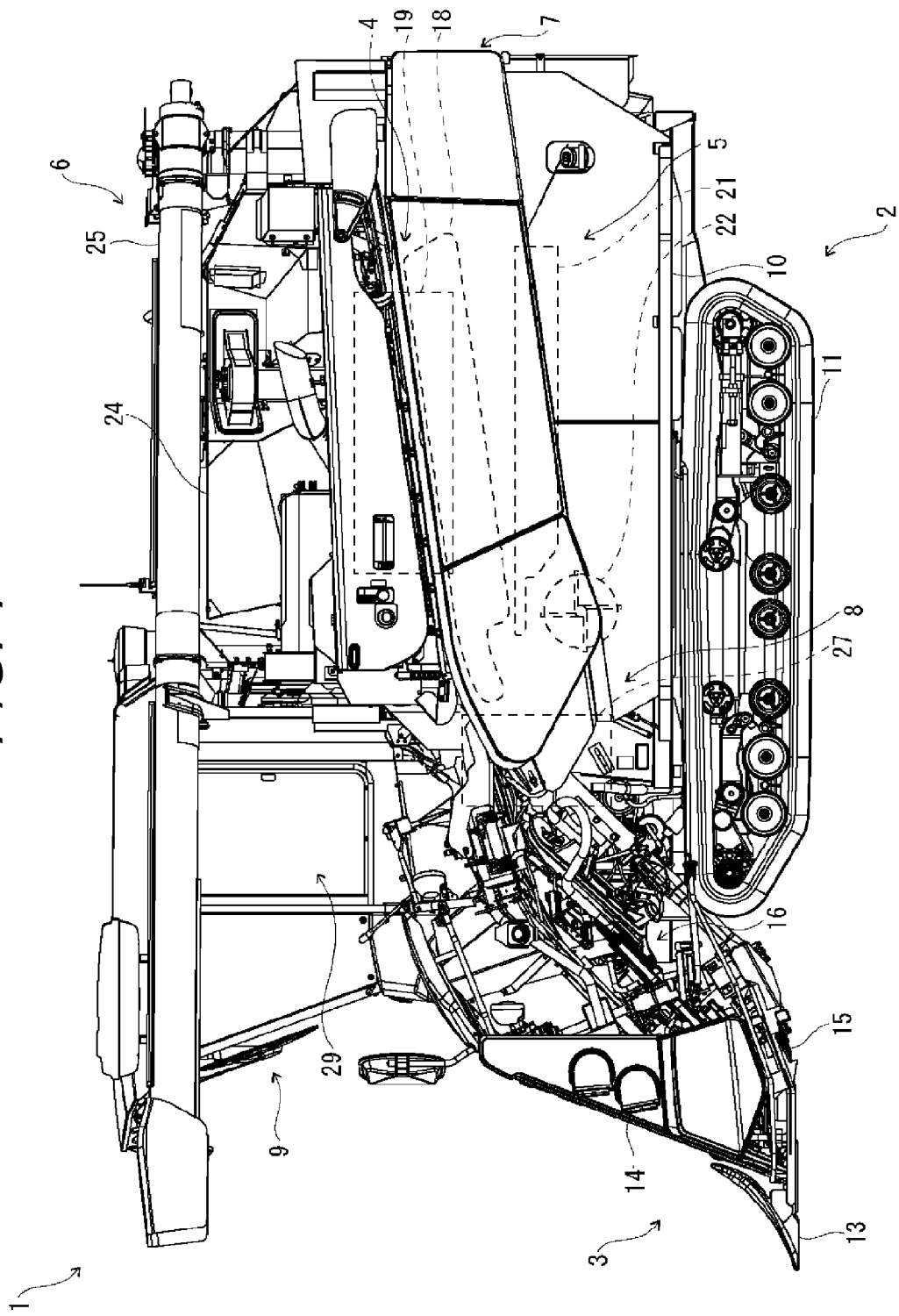
FIG. 1 is a side view of a combine harvester according to an embodiment of the present invention.

As shown in FIG. 1, the combine harvester 1 includes a traveling section 2, a reaping section 3, a threshing section 4, a sorting section 5, a storage section 6, a straw processing section 7, a power section 8, and an operation section 9, and is formed of a so-called head-feeding combine harvester. While the combine harvester 1 travels by the traveling section 2, the threshing section 4 threshes grain culms reaped by the reaping section 3, and the sorting section 5 sorts grains and stores the grains in the storage section 6. The combine harvester 1 treats the straw after threshing, with the straw processing section 7. The combine harvester 1 drives the traveling section 2, the reaping section 3, the threshing section 4, the sorting section 5, the storage section 6, and the straw processing section 7 by the power supplied from the power section 8.

The traveling section 2 is provided below a machine body frame 10, and includes a pair of left and right crawler type traveling devices 11 and a transmission (not illustrated). The traveling section 2 rotates the crawlers of the crawler type traveling devices 11 by the power (for example, rotational power) transmitted from an engine 27 of the power section 8, to cause the combine harvester 1 to travel in the front-rear direction or turn in the left-right direction. The transmission transmits the power (rotational power) of the power section 8 to the crawler type traveling devices 11, and can also shift the rotational power.

The reaping section 3 is provided in front of the traveling section 2. The reaping section 3 includes a divider 13, a raising device 14, a cutting device 15, and a conveying device 16. The divider 13 guides the grain culms of the field to the raising device 14. The raising device 14 raises the grain culms guided by the divider 13. The cutting device 15 cuts the grain culms raised by the raising device 14. The conveying device 16 conveys the grain culms cut by the cutting device 15 to the threshing section 4.

The threshing section 4 is provided behind the reaping section 3. The threshing section 4 includes a feed chain 18 and a threshing cylinder 19. The feed chain 18 conveys the grain culms conveyed from the conveying device 16 of the reaping section 3, for threshing, and further conveys the grain culms after threshing, that is, the straws, to the straw processing section 7. The threshing cylinder 19 threshes the grain culms being conveyed by the feed chain 18.

The sorting section 5 is provided below the threshing section 4. The sorting section 5 includes a vibrating sorting device 21, a wind sorting device 22, a grain conveying device (not illustrated), and a waste straw discharge device (not illustrated). The vibrating sorting device 21 sorts the threshed materials dropped from the threshing section 4 into grains, waste straws, and the like by sieving. The wind sorting device 22 further sorts the threshed materials sorted by the vibrating sorting device 21, into grains, waste straws, and the like by blowing air. The grain conveying device conveys the grains sorted by the vibrating sorting device 21 and the wind sorting device 22, to the storage section 6. The waste straw discharge device discharges the waste straws and the like sorted by the vibrating sorting device 21 and the wind sorting device 22, to the outside of the machine body.

The storage section 6 is provided on the right side of the threshing section 4. The storage section 6 includes a grain tank 24 and a discharge device 25. The grain tank 24 stores the grains conveyed from the sorting section 5. The discharge device 25 includes an auger and the like, and discharges the grains stored in the grain tank 24 to an arbitrary place.

The straw processing section 7 is provided behind the threshing section 4. The straw processing section 7 includes a straw conveying device (not illustrated) and a straw cutting device (not illustrated). The straw conveying device conveys the straws conveyed from the feed chain 18 of the threshing section 4, to the straw cutting device. The straw cutting device cuts the straws conveyed by the straw conveying device and discharges the straws to the outside of the machine body.

The power section 8 is provided above the traveling section 2 and in front of the storage section 6. The power section 8 includes the engine 27 that generates rotational power. The power section 8 transmits the rotational power generated by the engine 27 to the traveling section 2, the reaping section 3, the threshing section 4, the sorting section 5, the storage section 6, and the straw processing section 7.

The operation section 9 is provided above the power section 8. The operation section 9 includes a driver's seat 29 and a plurality of operation tools (not illustrated). The driver's seat 29 is a seat on which a worker sits, and is provided on the right side, for example. The operation tools include a handle for changing the movement direction of the combine harvester 1, that is, for steering the combine harvester 1, and the worker can steer the traveling and work of the combine harvester 1 by operating the operation tool such as the handle. In addition, the operation tools include an accelerator that adjusts the rotation speed of the engine 27, that is, the traveling speed of the traveling section 2 of the combine harvester 1, and a raising and lowering switch that raises and lowers the reaping section 3. In addition, the operation tools include a monitor capable of displaying a field image and the like captured by a machine body camera 32, a fixed camera 43, a mobile camera 54, or an aerial imaging camera 57 described below.

The combine harvester 1 includes the machine body camera 32 (see FIG. 3) that captures an image around the combine harvester 1. The machine body camera 32 captures an image of a work target field to acquire a field image.

Figure 2:
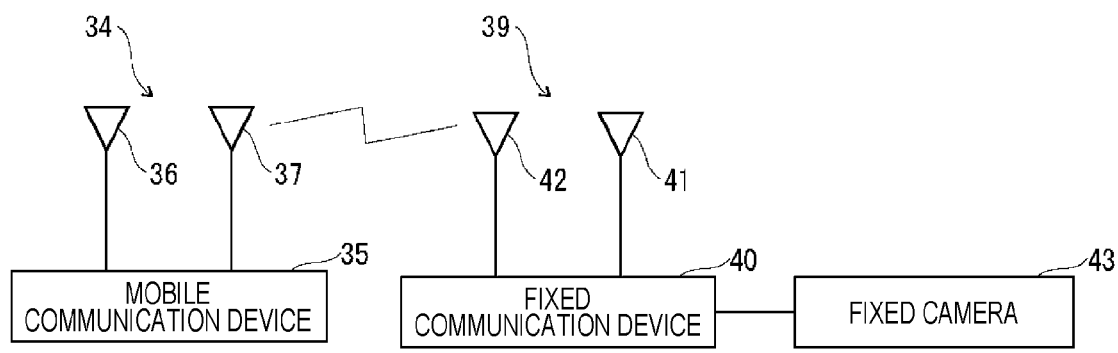
FIG. 2 is a block diagram of a mobile station and a base station of the combine harvester according to the embodiment of the present invention.

As illustrated in FIG. 2, the combine harvester 1 includes a mobile station 34 that acquires position information of the combine harvester 1 using a satellite positioning system such as a GPS. The mobile station 34 includes, for example, a mobile communication device 35, a mobile GPS antenna 36, and a data receiving antenna 37. The mobile communication device 35 acquires the position information of the mobile station 34, that is, the position information of the combine harvester 1 by communicating with a GPS satellite by the mobile GPS antenna 36.

In addition, as shown in FIG. 2, a base station 39 is installed on a ridge and the like around the work target field of the combine harvester 1, and the base station 39 includes a fixed communication device 40, a fixed GPS antenna 41, and a data transmitting antenna 42. The fixed communication device 40 acquires position information of the base station 39 by communicating with a GPS satellite by the fixed GPS antenna 41. The fixed communication device 40 transmits the correction information based on the position information of the base station 39 to the mobile communication device 35 via the data transmitting antenna 42.

In addition, the base station 39 includes the fixed camera 43 that captures an image of the field. The fixed camera 43 captures an image of the work target field to acquire a field image. The fixed communication device 40 acquires the image captured by the fixed camera 43 and transmits the image to the mobile communication device 35 via the data transmitting antenna 42.

The mobile communication device 35 of the mobile station 34 performs wireless communication with the fixed communication device 40 of the base station 39 via the data receiving antenna 37. The mobile communication device 35 receives the correction information from the fixed communication device 40, and corrects the position information of the mobile station 34, that is, the position information of the combine harvester 1, based on the correction information. The mobile communication device 35 receives the field image captured by the fixed camera 43, from the fixed communication device 40.

Figure 3:
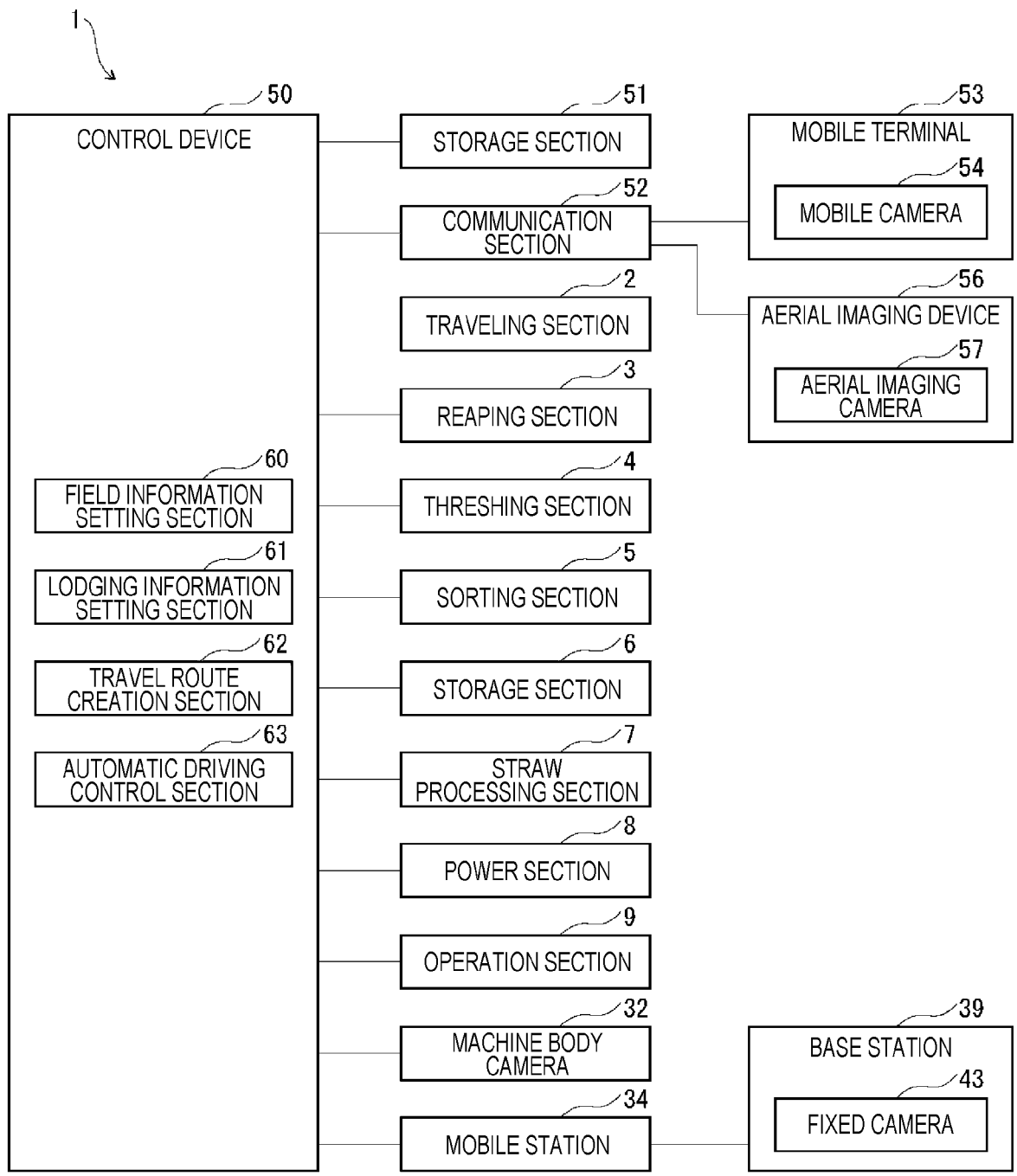
FIG. 3 is a block diagram of the combine harvester according to the embodiment of the present invention.

Next, a control device 50 of the combine harvester 1 will be described with reference to FIG. 3.

The control device 50 includes a computer such as a CPU, and is connected to a storage section 51 such as a ROM, a RAM, a hard disk drive, and a flash memory. The storage section 51 stores programs and data for controlling various components and various functions of the combine harvester 1, and the control device 50 controls various components and various functions by executing arithmetic processing based on the programs and data stored in the storage section 51. For example, the control device 50 controls the mobile station 34 to acquire position information of the combine harvester 1 from the mobile communication device 35.

The combine harvester 1 includes a communication section 52, and the control device 50 performs wireless communication with an external device such as a mobile terminal 53 possessed by the worker via the communication section 52, and transmits and receives various types of information to and from the mobile terminal 53. The mobile terminal 53 is a terminal capable of remotely operating the combine harvester 1, and includes, for example, a tablet terminal including a touch panel, a notebook personal computer, or the like. Note that an operation tool similar to the mobile terminal 53 may be provided in the operation section 9. The mobile terminal 53 includes the mobile camera 54 that captures an image. The mobile camera 54 acquires, for example, the field image by capturing the work target field.

The mobile terminal 53 is configured to receive an input operation by a touch operation and the like on the touch panel for the field information related to the work target field and the lodging information related to the lodging region where the grain culms are lodged by a predetermined angle or more in the field. The mobile terminal 53 displays, for example, a field information setting screen on which the shape of the field end constituting the outer periphery of the field (hereinafter, it is referred to as a field shape), the position information (coordinates and the like) of the field end, the row direction of the grain culms in the field, and the like can be set as the field information, and the mobile terminal 53 also displays a lodging information setting screen on which the shape of the lodging region, the position information (coordinates and the like) of the outer periphery of the lodging region, the lodging direction of the grain culms, the lodging angle of the grain culms, and the like can be set as the lodging information.

In addition, while displaying the field map based on the field information, the mobile terminal 53 can also display the travel route of the combine harvester 1 on the field map in a manner that the movement direction can be recognized, and further display the lodging region on the field map. Note that the mobile terminal 53 may display the field map on the lodging information setting screen to designate the lodging region in the field map.

The control device 50 performs wireless communication with an aerial imaging device 56 such as a drone provided with the aerial imaging camera 57, via the communication section 52. Note that the aerial imaging device 56 may perform wireless communication with the mobile terminal 53. The control device 50 or the mobile terminal 53 receives an operation instruction of the aerial imaging device 56 from the worker, and the aerial imaging device 56 operates according to the operation instruction received from the communication section 52 or the mobile terminal 53. In addition, the control device 50 or the mobile terminal 53 receives an imaging instruction of the field from the worker, and the aerial imaging device 56 receives the imaging instruction from the communication section 52 or the mobile terminal 53. The aerial imaging device 56 controls the aerial imaging camera 57 according to the imaging instruction, and the aerial imaging camera 57 captures the image of the field to acquire the field image. The aerial imaging device 56 transmits the field image captured by the aerial imaging camera 57 to the communication section 52 or the mobile terminal 53.

The control device 50 controls the machine body camera 32 to capture the field image and displays the field image on the monitor of the operation section 9. In addition, the control device 50 controls the mobile communication device 35 to receive the field image captured by the fixed camera 43 from the fixed communication device 40, and displays the field image on the monitor of the operation section 9. The control device 50 controls the communication section 52 to receive the field image captured by the mobile camera 54 from the mobile terminal 53, and displays the field image on the monitor of the operation section 9. The control device 50 controls the communication section 52 to receive the field image captured by the aerial imaging camera 57 from the aerial imaging device 56, and displays the field image on the monitor of the operation section 9.

In addition, the control device 50 executes the program stored in the storage section 51 to operate as a field information setting section 60, a lodging information setting section 61, a travel route creation section 62, and an automatic driving control section 63.

The field information setting section 60 automatically or manually sets field information related to the work target field, and stores the field information in the storage section 51. For example, the field information setting section 60 manually sets the field information according to the input operation of the field information on the field information setting screen of the mobile terminal 53. Alternatively, the field information setting section 60 acquires the field image acquired by capturing the image of the field by the machine body camera 32 of the combine harvester 1, the fixed camera 43 of the base station 39, the mobile camera 54 of the mobile terminal 53, or the aerial imaging camera 57 of the aerial imaging device 56, and automatically acquires field information by analyzing the field image. Note that the field information setting section 60 may analyze the field information from the field image of one camera among the machine body camera 32, the fixed camera 43, the mobile camera 54, or the aerial imaging camera 57, or may analyze the field information from the field images of two or more cameras.

In addition, the field information setting section 60 can acquire more accurate field information by achieving consistency between the field information manually set via the mobile terminal 53 and the field information automatically set from the field image of the machine body camera 32, the fixed camera 43, the mobile camera 54, or the aerial imaging camera 57.

The lodging information setting section 61 automatically or manually sets the lodging information related to the lodging region where the grain culms are lodged by a predetermined angle or more in the field, and stores the lodging information in the storage section 51. Note that the lodging region is not limited to the lodged grain culms, and may be set to a rectangular shape extending in the row direction of the grain culms and the crossing direction with respect to the row direction in a range including the lodged grain culms. As a result, it becomes easy to clearly identify the reaping area including the lodging region and the reaping area not including the lodging region, and it becomes easy to set a travel route suitable for each.

For example, the lodging information setting section 61 manually sets the lodging information according to the input operation of the lodging information on the lodging information setting screen of the mobile terminal 53. Alternatively, the lodging information setting section 61 acquires the field image acquired by capturing the image of the field by the machine body camera 32 of the combine harvester 1, the fixed camera 43 of the base station 39, the mobile camera 54 of the mobile terminal 53, or the aerial imaging camera 57 of the aerial imaging device 56, and automatically acquires the lodging information such as the shape of the lodging region, the position information of the outer periphery of the lodging region, and the lodging direction and the lodging angle of the grain culms by analyzing the field image. For example, an image of the field including normal grain culms that are not lodged is registered in advance, and the lodging information is analyzed by comparing the registered image of the normal field with the captured field image. Note that the lodging information setting section 61 may analyze the lodging information from the field image of one camera among the machine body camera 32, the fixed camera 43, the mobile camera 54, or the aerial imaging camera 57, or may analyze the lodging information from the field images of two or more cameras.

In addition, the lodging information setting section 61 can acquire more accurate lodging information by achieving consistency between the lodging information manually set via the mobile terminal 53 and the lodging information automatically set from the field image of the machine body camera 32, the fixed camera 43, the mobile camera 54, or the aerial imaging camera 57.

The travel route creation section 62 creates a travel route to be referred to by the combine harvester 1 for automatic travel and automatic reaping in the field by automatic driving, and stores the travel route in the storage section 51. The travel route includes not only travel setting related to traveling but also work setting related to work such as reaping. The travel setting includes, in addition to the traveling position in the field, a traveling speed and a movement direction (steering direction and forward or backward) at each traveling position. The work setting includes information related to operation or stop of reaping at each traveling position, a reaping speed and a reaping height, and other works. The travel route creation section 62 may set a route for reaping while traveling, to a straight line, and may set a travel route by combining a plurality of straight line routes with respect to a region including unreaped grain culms in the field.

The travel route creation section 62 may create a travel route to advance reaping from the surroundings toward the center side in the unreaped grain culm region, and may create a travel route in a manner that the side of the driver's seat 29 is outside the unreaped grain culm region. Note that, in creating or correcting a travel route, the travel route creation section 62 may temporarily create a plurality of candidate travel routes and select a travel route with higher work efficiency. Note that the work efficiency is determined in consideration of not only traveling accompanied by reaping but also an idle running distance, turning, and the like.

First, the travel route creation section 62 creates a travel route corresponding to the work target field in advance. The travel route creation section 62 may manually set the travel route according to the input operation using the mobile terminal 53, or may automatically set the travel route based on the field information set by the field information setting section 60. The travel route creation section 62 sets a travel route of a predetermined travel pattern such as round-trip reaping travel and whirl reaping travel. When the travel route includes an idle running route for moving from one straight line route to another straight line route in addition to the straight line route for reaping the grain culms, the travel route creation section 62 may create the travel route in a manner that the idle running distance of the idle travel route becomes shorter.

In addition, the travel route creation section 62 determines whether or not reaping corresponding to the travel route in the lodging region is appropriate based on the set travel route, the field information, and the lodging information set by the lodging information setting section 61, and corrects the travel route to appropriately reap the grain culms in the lodging region in a case where the reaping is not appropriate. The travel route creation section 62 may analyze the corrected travel route and corrects the travel route in a manner that the idle running distance of the idle running route becomes shorter.

For example, the travel route creation section 62 determines the reaping direction for the grain culms in the lodging region based on the movement direction of the travel route in the lodging region and the lodging direction of the grain culms in the lodging region. When the movement direction is the same direction as the lodging direction of the grain culms, the reaping direction corresponds to following reaping, and when the movement direction is the opposite direction to the lodging direction of the grain culms, the reaping direction corresponds to facing reaping. In addition, when the movement direction faces the left lodged grain culms, the reaping direction corresponds to left lodging reaping, and when the movement direction faces the right lodged grain culms, the reaping direction corresponds to right lodging reaping. In a case where the crops are rice plants, wheats, and the like, the following reaping or the left lodging reaping corresponds to a preferable recommended reaping direction, and in other cases, the facing reaping may correspond to the recommended reaping direction.

Then, in a case where the reaping direction of the travel route in the lodging region is different from the predetermined recommended reaping direction, for example, in a case where with respect to grain culms of rice plants, wheats, or the like, the reaping direction of the travel route in the lodging region is a direction corresponding to the facing reaping or the like different from the following reaping or the left lodging reaping, the travel route creation section 62 determines that it is necessary to correct the travel route in the lodging region, and corrects the travel route in a manner that the reaping direction in the lodging region becomes the recommended reaping direction. In a case of correcting the travel route for reaping rice plants, wheats, and the like, the travel route creation section 62 may preferentially set the following reaping, and may set the left lodging reaping instead of the following reaping in order to further shorten the idle running distance. For example, when the reaping direction in the lodging region corresponds to the facing reaping, the travel route creation section 62 can correct the travel route so that the movement direction becomes opposite, and thus, the reaping direction in the lodging region can be corrected so as to correspond to the following reaping which is performed in the recommended reaping direction.

Based on the travel setting and the work setting of the travel route created by the travel route creation section 62, the automatic driving control section 63 controls the power section 8, the traveling section 2, and the reaping section 3 to execute automatic travel and automatic reaping according to the travel route. The automatic driving control section 63 causes the reaping section 3 to automatically reap unreaped grain culms on the travel route. In addition, along with the automatic reaping, the automatic driving control section 63 controls the threshing section 4, the sorting section 5, the storage section 6, and the straw processing section 7 to automatically execute: threshing of the grain culms after reaping; sorting of the grains or the waste straws after threshing; storage of the grains after sorting; treatment of the straws after threshing; and the like. Note that the combine harvester 1 may include a gyro sensor and a direction sensor to acquire displacement information and direction information of the combine harvester 1, and the automatic driving control section 63 may adjust automatic travel of the combine harvester 1 based on the displacement information and the direction information.

Figure 4:
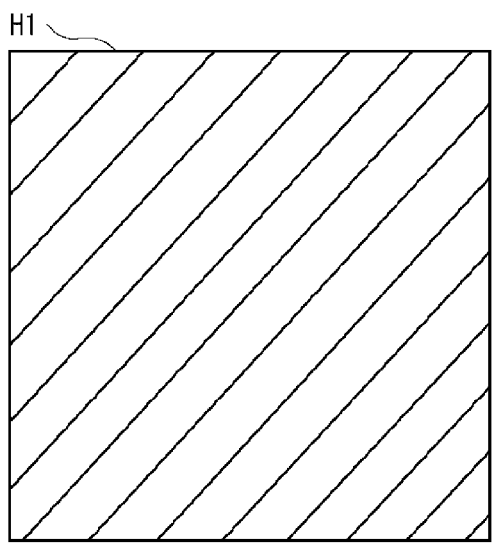
FIG. 4 is a plan view illustrating a field of a first example of the combine harvester according to the embodiment of the present invention.
Figure 5:
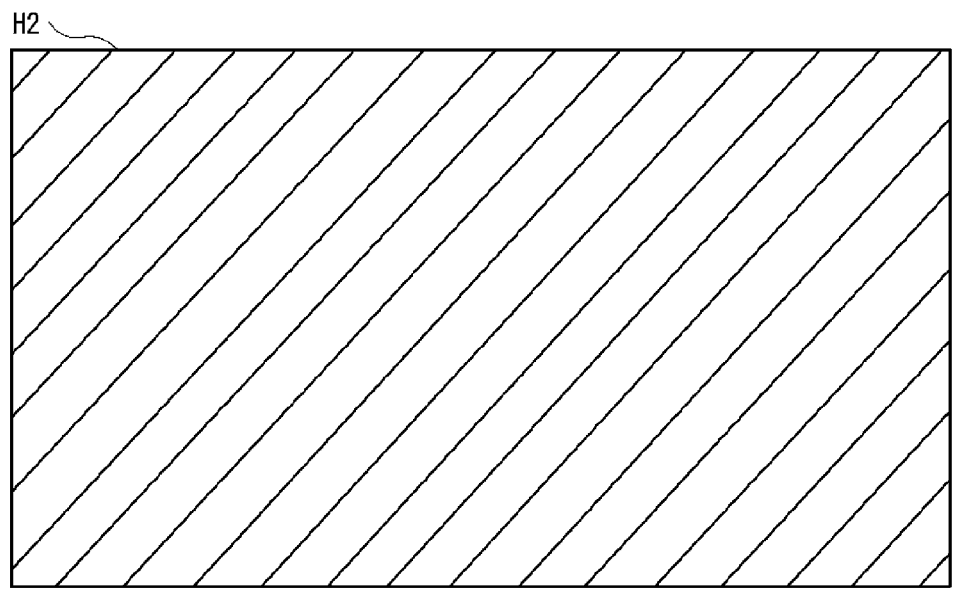
FIG. 5 is a plan view illustrating the field of the first example of the combine harvester according to the embodiment of the present invention.

Next, an example in which the travel route creation section 62 creates a travel route of round-trip reaping travel in advance and then corrects the travel route based on the lodging information will be described as a first example. Note that, in the first example, as illustrated in FIGS. 4 and 5, fields H1 and H2 formed in a rectangular shape and including rice plants, wheats, and the like as crops are set as work targets, and the longitudinal direction in the plane of paper of FIGS. 4 and 5 is the row direction of the grain culms in the fields H1 and H2. In each of FIGS. 4, 5, and the like, the unreaped grain culm region of the fields H1 and H2 is indicated by oblique lines rising to the right. In the field H2 illustrated in FIG. 5, a length in the arrangement direction of the rows is longer than that of the field H1 illustrated in FIG. 4, and thus, the number of the rows in the field H2 is larger than that in the field H1.

Figure 6:
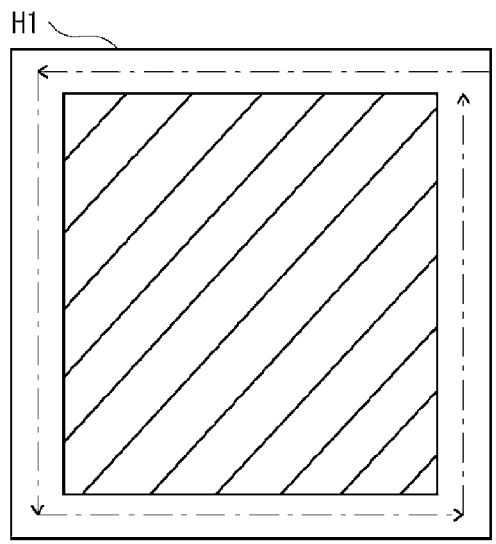
FIG. 6 is a plan view illustrating the field of the first example of the combine harvester according to the embodiment of the present invention together with a headland.
Figure 7:
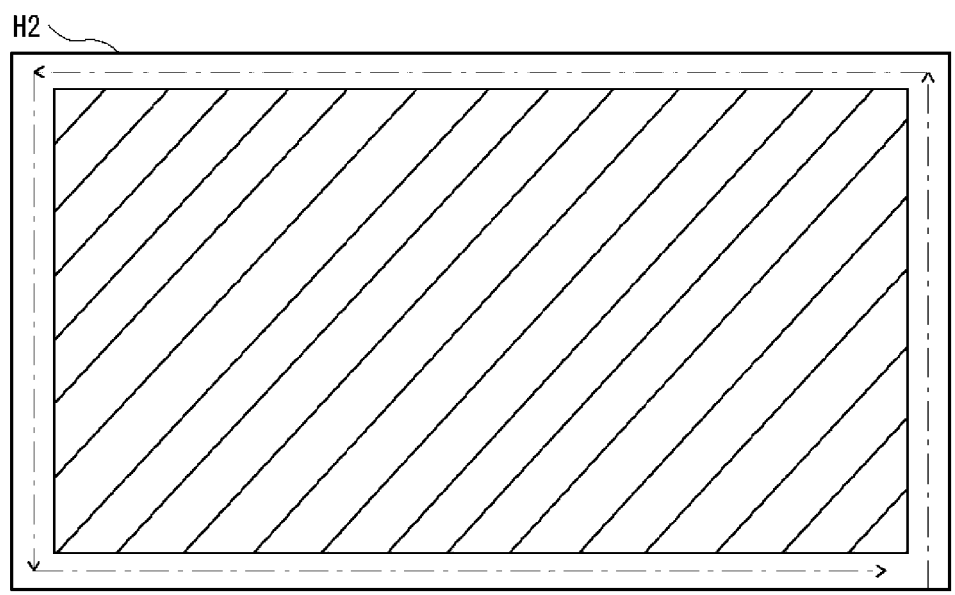
FIG. 7 is a plan view illustrating the field of the first example of the combine harvester according to the embodiment of the present invention together with the headland.
Figure 8:
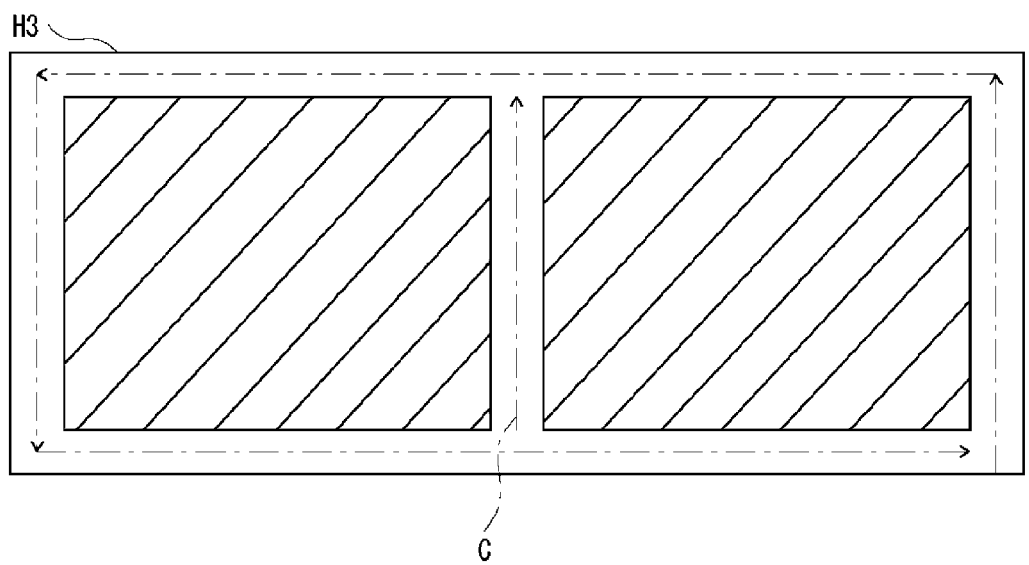
FIG. 8 is a plan view illustrating another example of the field of the first example of the combine harvester according to the embodiment of the present invention.

In the first example, first, before the automatic driving of the round-trip reaping travel is started, in order to secure a turning space at the time of the round-trip reaping travel, the combine harvester 1 is manually operated to travel and reap, so as to create the headlands along the outer peripheries of the fields H1 and H2 as illustrated in FIGS. 6 and 7. In each of FIGS. 6, 7, and the like, the route after reaping is indicated by an alternate long and short dash line. The worker controls the power section 8, the traveling section 2, and the reaping section 3 of the combine harvester 1 by manual operation, and performs traveling and reaping to circle inside of the fields H1 and H2 along the field ends. As a result, a headland for turning by automatic travel is created along the field end. Note that, as illustrated in FIG. 8, in a field H3 in which the length in the arrangement direction of the rows is long, the unreaped grain culm region where the automatic driving is performed may be divided by an intermediate division C.

Next, the field information setting section 60 automatically or manually sets, as the field information of the unreaped grain culm region of the fields H1 and H2: the shape of the unreaped grain culm region to be the field shape; the position information of the end portion of the unreaped grain culm region to be the field end; the row direction of the unreaped grain culms; and the like.

Figure 9:
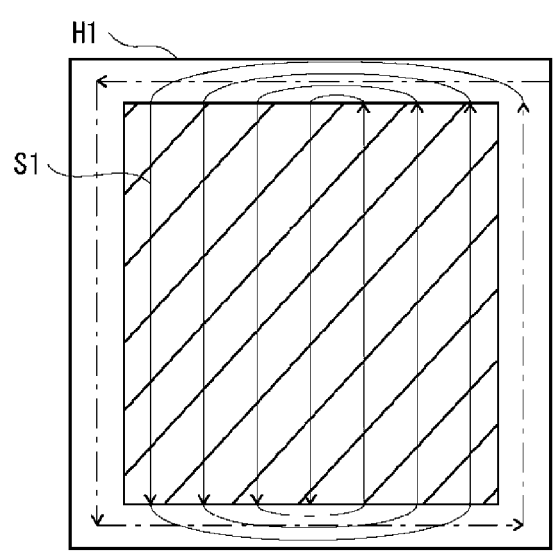
FIG. 9 is a plan view illustrating the field of the first example of the combine harvester according to the embodiment of the present invention together with a travel route.
Figure 10:
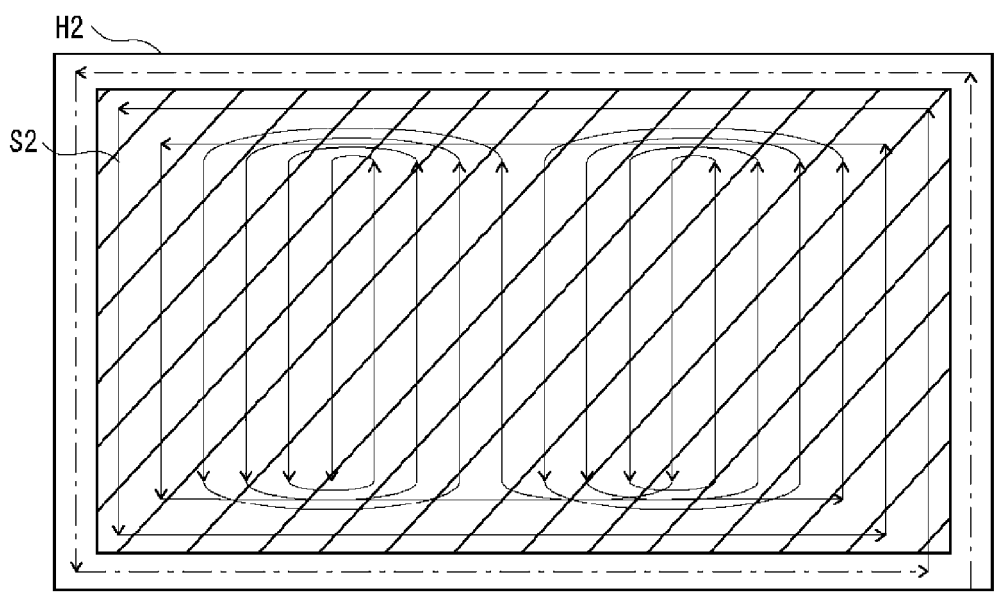
FIG. 10 is a plan view illustrating the field of the first example of the combine harvester according to the embodiment of the present invention together with the travel route.

As illustrated in FIGS. 9 and 10, the travel route creation section 62 creates in advance travel routes S1 and S2 for automatic travel and automatic reaping in round-trip reaping travel in the unreaped grain culm region based on the field information of the unreaped grain culm region, and stores the travel routes S1 and S2 in the storage section 51. FIGS. 9 and 10 illustrate the travel routes S1 and S2 in which a straight line route makes a round trip along a row direction. Note that, in the field H2 illustrated in FIG. 5 in which the length in the arrangement direction of the rows is longer than that of the field H1 illustrated in FIG. 4, the unreaped grain culm region may be divided in the arrangement direction of the rows, and the travel route S2 may be set in a manner that the round-trip reaping travel is performed in each of the divided regions. In addition, as illustrated in FIG. 8, in the field H3 in which the length in the arrangement direction of the rows is long, the travel route may be set in a manner that reaping is performed sequentially in the regions divided by the intermediate division C.

Figure 11:
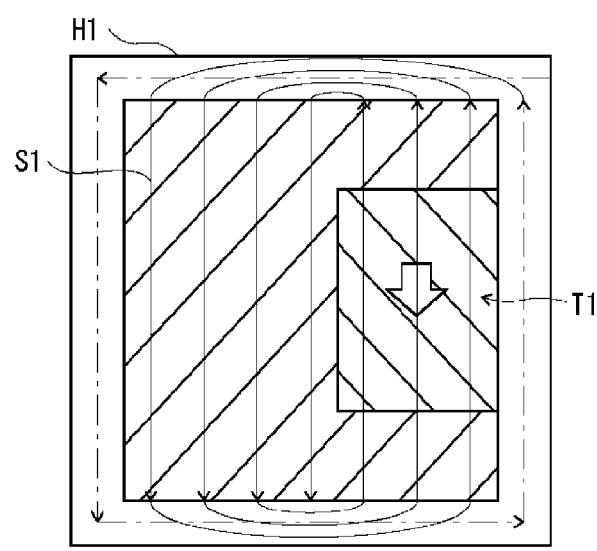
FIG. 11 is a plan view illustrating the field of the first example of the combine harvester according to the embodiment of the present invention together with a lodging region and the travel route.
Figure 12:
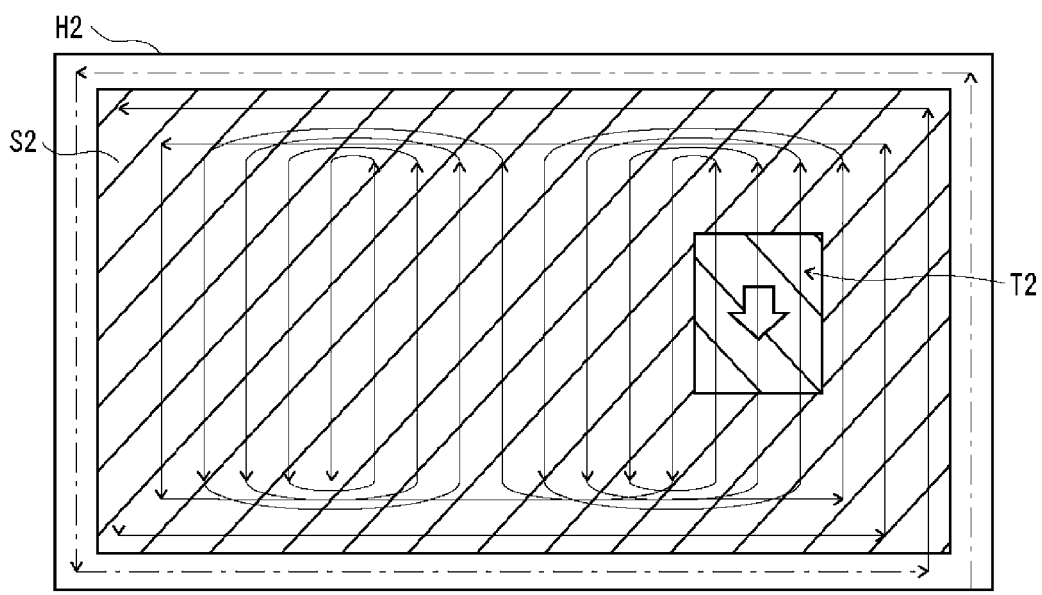
FIG. 12 is a plan view illustrating the field of the first example of the combine harvester according to the embodiment of the present invention together with the lodging region and the travel route.

In addition, the lodging information setting section 61 automatically sets the lodging information in a case where the lodging region is detected from the field H1 or H2 based on the field image acquired by the machine body camera 32, the fixed camera 43, the mobile camera 54, or the aerial imaging camera 57, or manually sets the lodging information in accordance with the input operation of the mobile terminal 53 by the worker and stores the lodging information in the storage section 51 in a case where the worker detects the lodging region by visually recognizing the field H1 or H2. In the first example, as illustrated in FIGS. 11 and 12, the lodging information setting section 61 sets the lodging information of lodging regions T1 and T2 in which the grain culms are lodged in the direction opposite to the movement direction in the unreaped grain culm region of the fields H1 and H2. In each of FIGS. 11, 12, and the like, the lodging regions T1 and T2 are indicated by oblique lines rising to the left, and the lodging direction of the grain culms is indicated by white arrows.

When the lodging information is set by the lodging information setting section 61, the travel route creation section 62 corrects the travel routes S1 and S2 of the round-trip reaping travel based on the lodging information. In the first example, as illustrated in FIGS. 11 and 12, since the grain culms in the lodging regions T1 and T2 are lodged in the direction opposite to the movement direction, the reaping direction of the travel routes S1 and S2 before correction corresponds to the facing reaping which is performed in a direction different from the recommended reaping direction. Therefore, the travel routes S1 and S2 are corrected in a manner that the movement directions in the lodging regions T1 and T2 are reversed to perform the following reaping. In order to appropriately reap the lodged grain culms in the lodging regions T1 and T2, the travel route creation section 62 sets travel settings and work settings specific to the lodged grain culms for the travel routes S1 and S2 in the lodging regions T1 and T2. For example, the travel route creation section 62 sets the travel speed to a low speed as the travel setting specific to the lodged grain culms, and sets the reaping speed to a high speed as the work setting specific to the lodged grain culms. The travel route creation section 62 may set the travel speed and the reaping speed according to the lodging angle of the grain culms for the travel routes S1 and S2 in the lodging regions T1 and T2.

Figure 13:
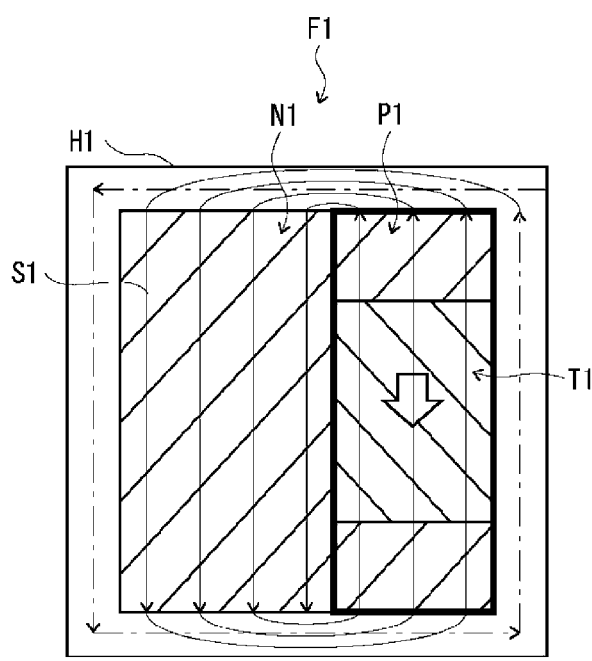
FIG. 13 is a plan view illustrating the field of the first example of the combine harvester according to the embodiment of the present invention by dividing a lodging influence region into a unidirectional reaping corresponding region and a unidirectional reaping unnecessary region.
Figure 14:
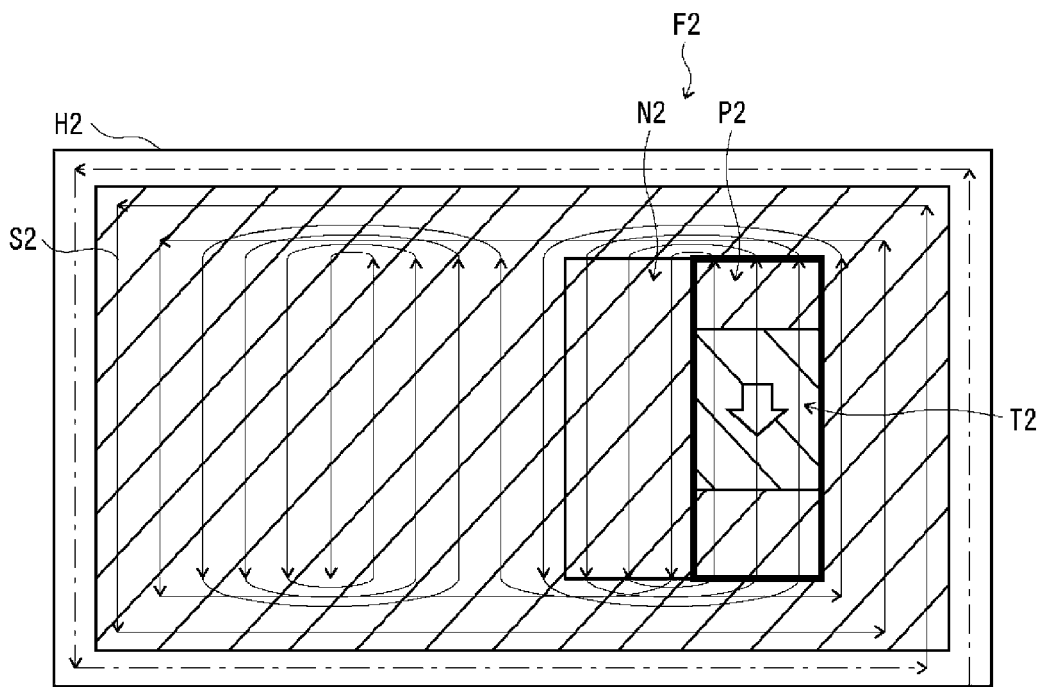
FIG. 14 is a plan view illustrating the field of the first example of the combine harvester according to the embodiment of the present invention by dividing the lodging influence region into the unidirectional reaping corresponding region and the unidirectional reaping unnecessary region.

By the way, the correction of the travel routes S1 and S2 in the lodging regions T1 and T2 affects traveling over the entire rows including the lodging regions T1 and T2, in other words, affects traveling over the entire straight line route passing through the lodging regions T1 and T2. Therefore, as illustrated in FIGS. 13 and 14, the travel route creation section 62 determines, as a unidirectional reaping corresponding route, a straight line route passing through the lodging regions T1 and T2 in which a reaping direction is different from the recommended reaping direction, and determines a region including the unidirectional reaping corresponding route, as unidirectional reaping corresponding regions P1 and P2. In each of FIGS. 13, 14, and the like, the unidirectional reaping corresponding regions P1 and P2 are indicated by thick lines. The unidirectional reaping corresponding regions P1 and P2 initially set have the same length of the rows as that in the unreaped grain culm region in the row direction.

Figure 15:
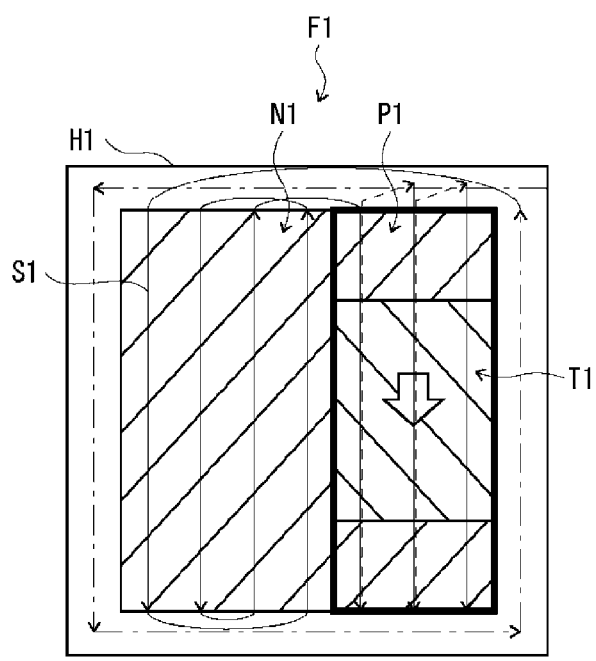
FIG. 15 is a plan view illustrating the field of the first example of the combine harvester according to the embodiment of the present invention together with a corrected travel route.
Figure 16:
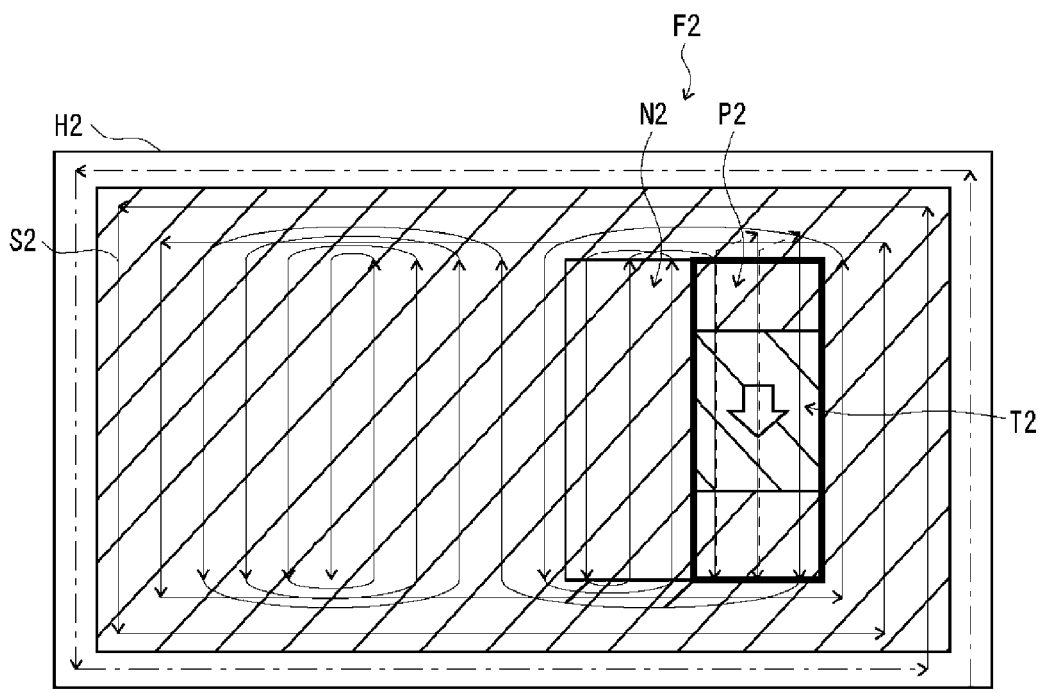
FIG. 16 is a plan view illustrating the field of the first example of the combine harvester according to the embodiment of the present invention together with the corrected travel route.

In the unidirectional reaping corresponding regions P1 and P2, regardless of whether or not they are the lodging regions T1 and T2, the travel route creation section 62 sets the recommended reaping direction, which is to be set in the lodging regions T1 and T2, over the entire unidirectional reaping corresponding route, that is, sets the movement direction, which is to be set in the lodging regions T1 and T2, over the entire unidirectional reaping corresponding route, and corrects the travel routes S1 and S2 to perform the unidirectional reaping in this movement direction. In the first example, as shown in FIGS. 15 and 16, the travel route creation section 62 corrects the travel routes S1 and S2 in a manner that the movement direction of the unidirectional reaping corresponding route is reversed and the following reaping is performed. At this time, the travel route creation section 62 sets the finish position at end portions on the lodging direction side of the grain culms in the unidirectional reaping corresponding route, and sets the start position at end portions on the side opposite to the finish position.

In addition, since the fields H1 and H2 of the first example include the lodging regions T1 and T2 in which the grain culms are lodged over a plurality of rows, the travel route creation section 62 determines the unidirectional reaping corresponding regions P1 and P2 including a plurality of unidirectional reaping corresponding routes. In this case, for example, as illustrated in FIGS. 15 and 16, the travel route creation section 62 corrects the travel routes S1 and S2 to start automatic reaping from a unidirectional reaping corresponding route on one end side in the arrangement direction of the rows, perform unidirectional reaping from a start position to a finish position of the unidirectional reaping corresponding route, then move backward from the finish position to the start position, and shift to unidirectional reaping in another adjacent unidirectional reaping corresponding route. In each of FIGS. 15, 16, and the like, the backward movement is indicated by a broken line.

The correction of the travel routes S1 and S2 in the lodging regions T1 and T2 affects not only the travel on the straight line route including the lodging regions T1 and T2 but also the travel on another straight line route connected to the straight line route and not including the lodging regions T1 and T2. In the round-trip reaping travel of the travel routes S1 and S2 shown in FIGS. 15 and 16, in a case where the unidirectional reaping corresponding route which is a straight line route including the lodging regions T1 and T2 is set as the forward route or the return route, a straight line route not including the lodging regions T1 and T2 is set as the return route or the forward route. When such a unidirectional reaping corresponding route as the forward route or the return route is corrected, the travel on the straight line route as the return route or the forward route connected to the corrected unidirectional reaping corresponding route is affected.

Therefore, as illustrated in FIGS. 15 and 16, the travel route creation section 62 determines, as a lodging influence route, a straight line route on which traveling is affected due to correction of the travel routes S1 and S2 in the lodging regions T1 and T2, and determines a region including the lodging influence route, as lodging influence regions F1 and F2. Therefore, the lodging influence route includes the unidirectional reaping corresponding route, and the lodging influence regions F1 and F2 include the unidirectional reaping corresponding regions P1 and P2. The travel route creation section 62 determines a route other than the unidirectional reaping corresponding route among the lodging influence routes, as a unidirectional reaping unnecessary route, and determines regions other than the unidirectional reaping corresponding regions P1 and P2 in the lodging influence regions F1 and F2, as unidirectional reaping unnecessary regions N1 and N2. In each of FIGS. 13, 14, and the like, the unidirectional reaping unnecessary regions N1 and N2 are indicated by normal lines. The unidirectional reaping unnecessary regions N1 and N2 initially set have the same length of the rows as that in the unreaped grain culm region in the row direction.

Since the unidirectional reaping unnecessary regions N1 and N2 do not include the lodging regions T1 and T2, it is not necessary to perform the unidirectional reaping in the unidirectional reaping unnecessary route, and the reaping direction can be freely set. Since the unidirectional reaping corresponding route is limited to the unidirectional reaping, the travel route creation section 62 may correct the travel routes S1 and S2 of the unidirectional reaping unnecessary route, which is not limited to the unidirectional reaping, after correcting the travel routes S1 and S2 as described above for the unidirectional reaping corresponding route among the lodging influence routes.

Note that, in the first example, an example is described in which the travel route creation section 62 corrects the travel routes S1 and S2 to perform the round-trip reaping travel on the unidirectional reaping unnecessary route in the unidirectional reaping unnecessary regions N1 and N2. However, the correction in the unidirectional reaping unnecessary regions N1 and N2 is not limited to the round-trip reaping travel, and the travel route creation section 62 may correct the travel routes S1 and S2 to perform the whirl reaping travel in the unidirectional reaping unnecessary regions N1 and N2. In addition, in the first example, since the travel routes S1 and S2 before the correction are started from the unidirectional reaping unnecessary regions N1 and N2, the travel routes S1 and S2 after the correction are also started from the unidirectional reaping unnecessary regions N1 and N2 in order to shorten the idle running distance. However, in a case where the travel routes S1 and S2 before the correction are started from the unidirectional reaping corresponding regions P1 and P2, the travel routes S1 and S2 after the correction may also be started from the unidirectional reaping corresponding regions P1 and P2.

Furthermore, the travel route creation section 62 determines a region (hereinafter, referred to as a normal region), not including the lodging regions T1 and T2, of the unidirectional reaping corresponding regions P1 and P2, based on the positions of the lodging regions T1 and T2 in the unidirectional reaping corresponding regions P1 and P2. Then, as compared with the case where the normal region is reaped continuously with the lodging regions T1 and T2, the travel route creation section 62 corrects the initially set unidirectional reaping corresponding regions P1 and P2 and further determines the normal region as the unidirectional reaping unnecessary regions N1 and N2 when achieving better work efficiency in the case where the normal region is reaped independently of the lodging regions T1 and T2. The reaping in the normal region independent of the lodging regions T1 and T2 is reaping with a travel pattern different from that of the unidirectional reaping in the lodging regions T1 and T2, and is reaping in a case where a predetermined travel pattern such as the round-trip reaping travel or the whirl reaping travel is set only in the normal region.

As shown in FIGS. 15 and 16, in a case where the unidirectional reaping corresponding route includes a straight line route along the row direction, the unidirectional reaping corresponding regions P1 and P2 have the same width as the lodging regions T1 and T2 in the arrangement direction of the rows, and are formed along the row direction. Therefore, in the unidirectional reaping corresponding regions P1 and P2, the lodging regions T1 and T2 and the normal region are arranged side by side in the row direction.

For example, in the field H1 of the example illustrated in FIG. 15, the normal region is arranged in front of and behind a lodging region T1, and the length of the normal region in the row direction is relatively short. In this case, in consideration of the idle running distance to the normal region and the turning in the normal region, the travel route creation section 62 can determine that, compared with the case where the automatic driving in the normal region is performed by setting an independent travel pattern in the normal region, the work efficiency is better in the case where the automatic driving in the normal region is performed by setting continuous unidirectional reaping in the normal region and the lodging region T1, because the idle running distance is short and the turning is small. Therefore, the travel route creation section 62 sets the travel route S1 of the unidirectional reaping over the entire unidirectional reaping corresponding region P1 as described above, without correcting the initially set unidirectional reaping corresponding region P1 and setting the independent travel route S1 as the normal region.

Figure 17:
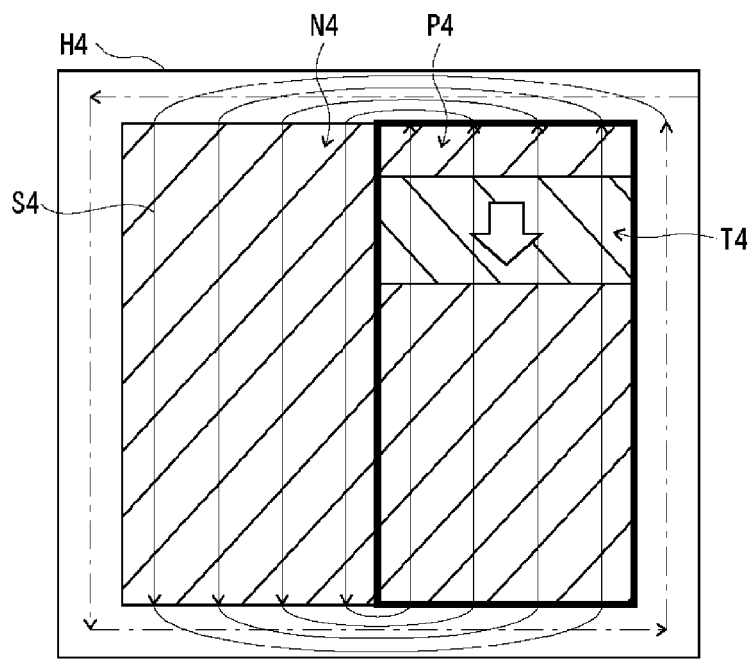
FIG. 17 is a plan view illustrating another example of the field of the first example of the combine harvester according to the embodiment of the present invention together with the lodging region and the travel route.

Alternatively, in a field H4 of the example illustrated in FIG. 17, while the normal region is arranged in front of and behind a lodging region T4, the length in the row direction of the normal region behind the lodging region T4 is relatively short, and the length in the row direction of the normal region in front of the lodging region T4 is relatively long. Also in the field H4, the travel route creation section 62 sets a travel route S4 based on the field information, and sets a unidirectional reaping corresponding region P4 and a unidirectional reaping unnecessary region N4.

Figure 18:
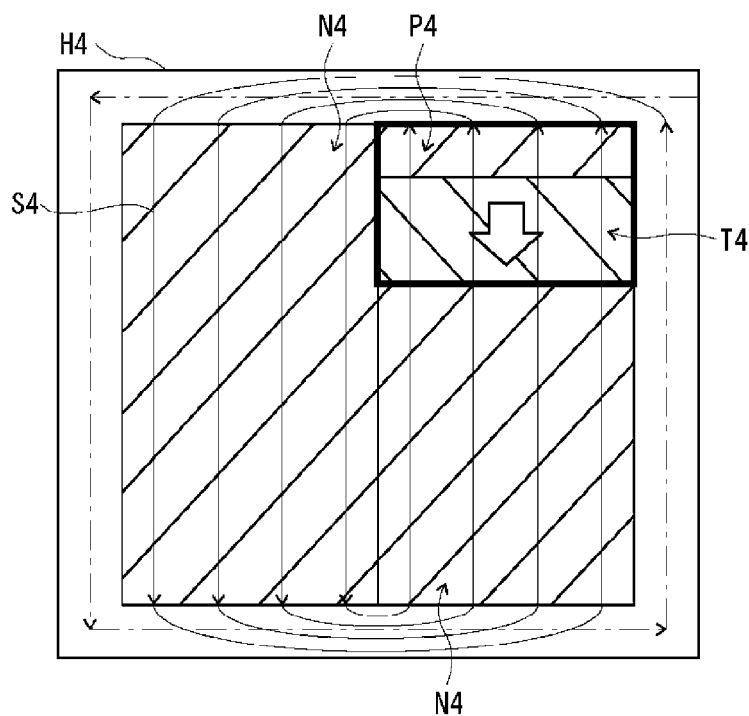
FIG. 18 is a plan view illustrating another example of the field of the first example of the combine harvester according to the embodiment of the present invention by dividing the lodging influence region into the unidirectional reaping corresponding region and the unidirectional reaping unnecessary region.

The travel route creation section 62 cannot set the independent travel route S4 with high work efficiency in the normal region behind the lodging region T4, but can set the independent travel route S4 with high work efficiency in the normal region in front of the lodging region T4. Therefore, as illustrated in FIG. 18, the travel route creation section 62 corrects the unidirectional reaping corresponding region P4 set initially, and sets the unidirectional reaping unnecessary region N4 in the front normal region. Then, as illustrated in FIG. 19, the travel route S4 of the unidirectional reaping is set for the unidirectional reaping corresponding region P4 including the lodging region T4 and the rear normal region, and the travel route S4 independent of the lodging region T4 is set for the unidirectional reaping unnecessary region N4 including the front normal region.

Figure 19:
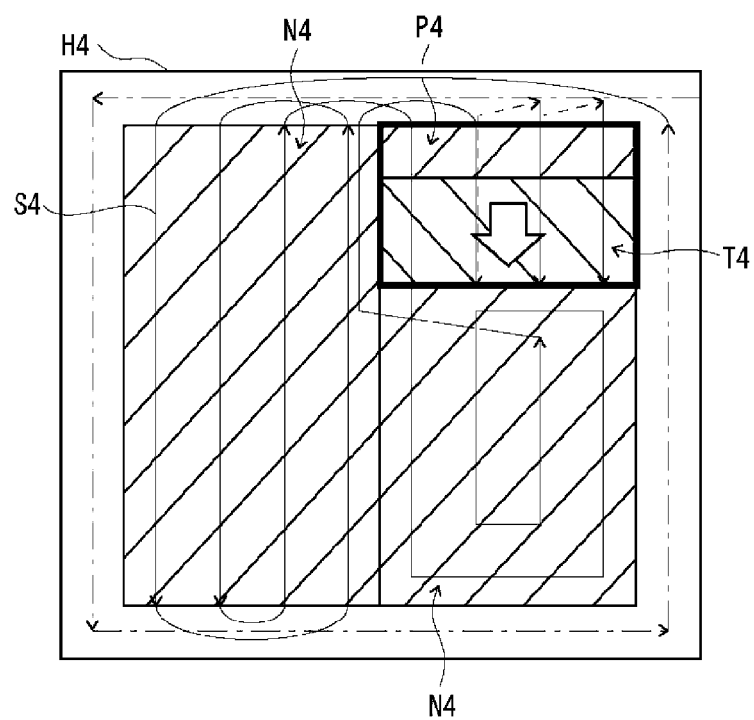
FIG. 19 is a plan view illustrating another example of the field of the first example of the combine harvester according to the embodiment of the present invention together with the corrected travel route.

Note that, in the example illustrated in FIG. 19, the reaping of the front normal region is performed and then the reaping of the lodging region T4 and the rear normal region is performed. However, in another example, the reaping of the front normal region may be performed after the reaping of the lodging region T4 and the rear normal region is performed according to the row direction. In addition, in the example illustrated in FIG. 19, the whirl reaping is set for the front normal region, but the round-trip reaping may be set.

Figure 20:
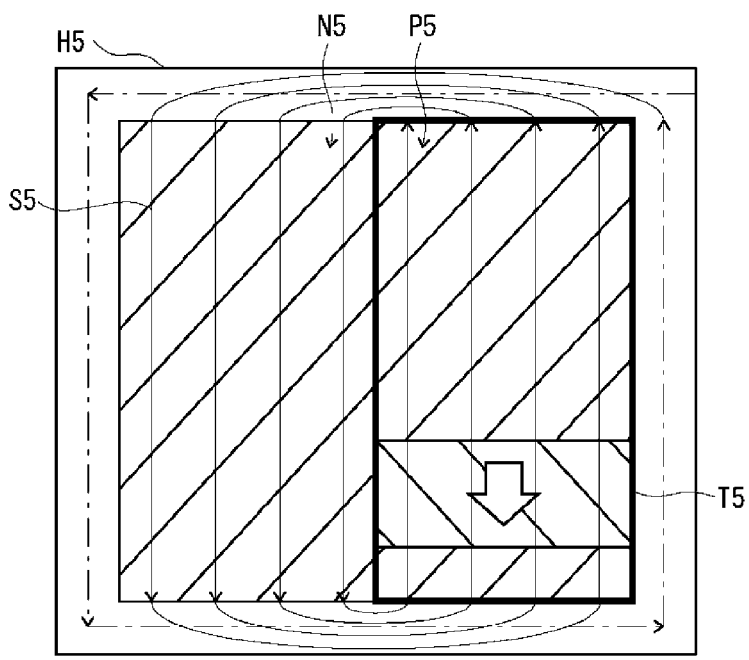
FIG. 20 is a plan view illustrating another example of the field of the first example of the combine harvester according to the embodiment of the present invention together with the lodging region and the travel route.

Alternatively, in a field H5 of the example illustrated in FIG. 20, while the normal region is arranged in front of and behind a lodging region T5, the length in the row direction of the normal region in front of the lodging region T5 is relatively short, and the length in the row direction of the normal region behind the lodging region T5 is relatively long. Also in the field H5, the travel route creation section 62 sets a travel route S5 based on the field information, and sets a unidirectional reaping corresponding region P5 and a unidirectional reaping unnecessary region N5.

Figure 21:
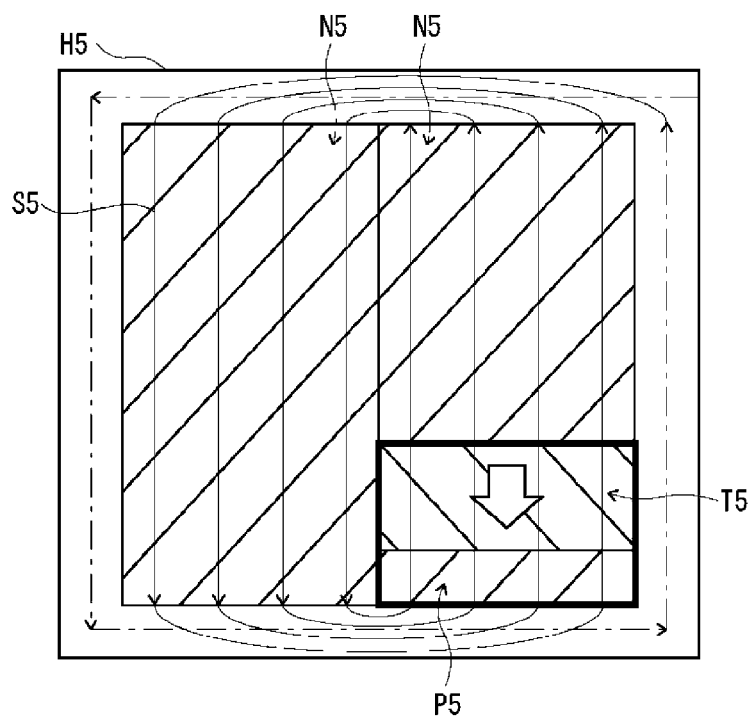
FIG. 21 is a plan view illustrating another example of the field of the first example of the combine harvester according to the embodiment of the present invention by dividing the lodging influence region into the unidirectional reaping corresponding region and the unidirectional reaping unnecessary region.

The travel route creation section 62 cannot set the independent travel route S5 with high work efficiency in the normal region in front of the lodging region T5, but can set the independent travel route S5 with high work efficiency in the normal region behind the lodging region T5. Therefore, as illustrated in FIG. 21, the travel route creation section 62 corrects the unidirectional reaping corresponding region P5 set initially, and sets the unidirectional reaping unnecessary region N5 in the rear normal region. Then, as illustrated in FIG. 22, the travel route S5 of the unidirectional reaping is set for the unidirectional reaping corresponding region P5 including the lodging region T5 and the front normal region, and the travel route S5 independent of the lodging region T5 is set for the unidirectional reaping unnecessary region N5 including the rear normal region.

Figure 22:
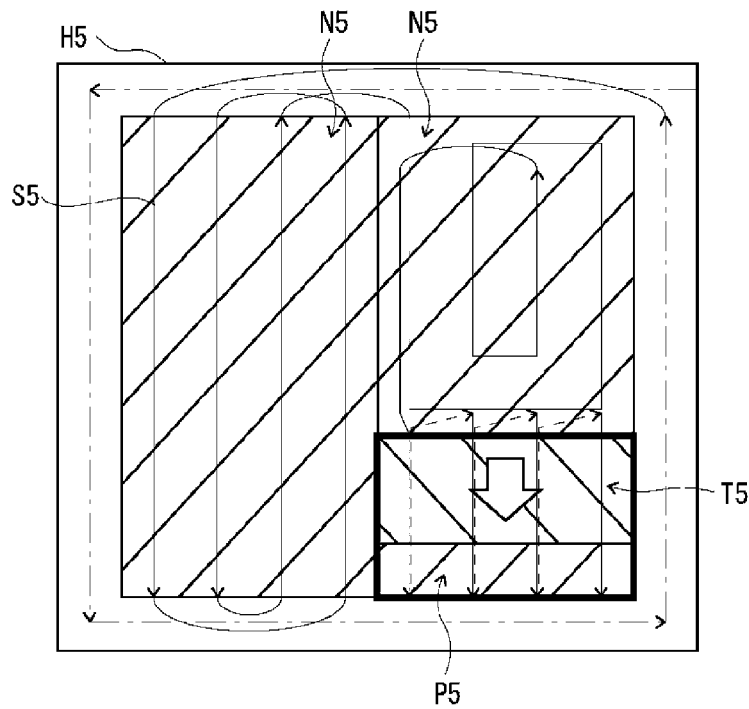
FIG. 22 is a plan view illustrating another example of the field of the first example of the combine harvester according to the embodiment of the present invention together with the corrected travel route.

Note that, in the example illustrated in FIG. 22, the whirl reaping is set for the rear normal region, but the round-trip reaping may be set.

Figure 23:
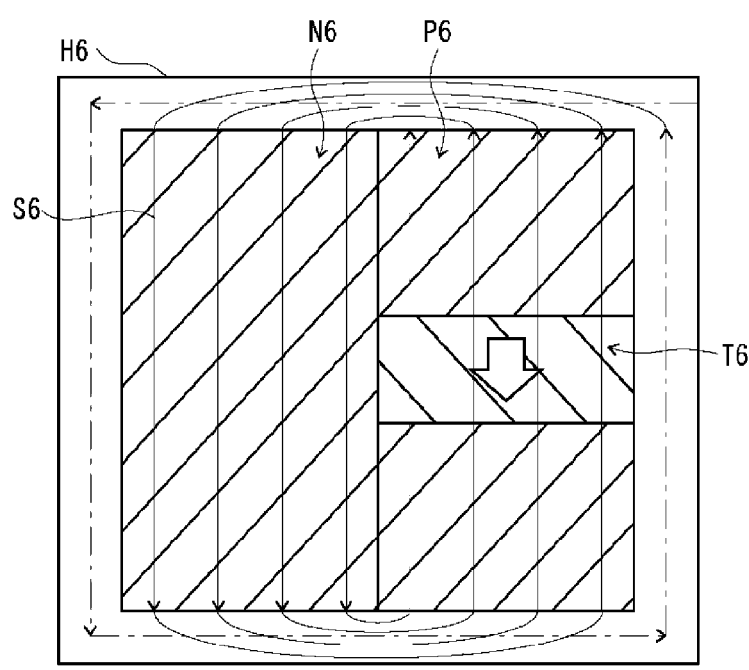
FIG. 23 is a plan view illustrating another example of the field of the first example of the combine harvester according to the embodiment of the present invention together with the lodging region and the travel route.
Figure 24:
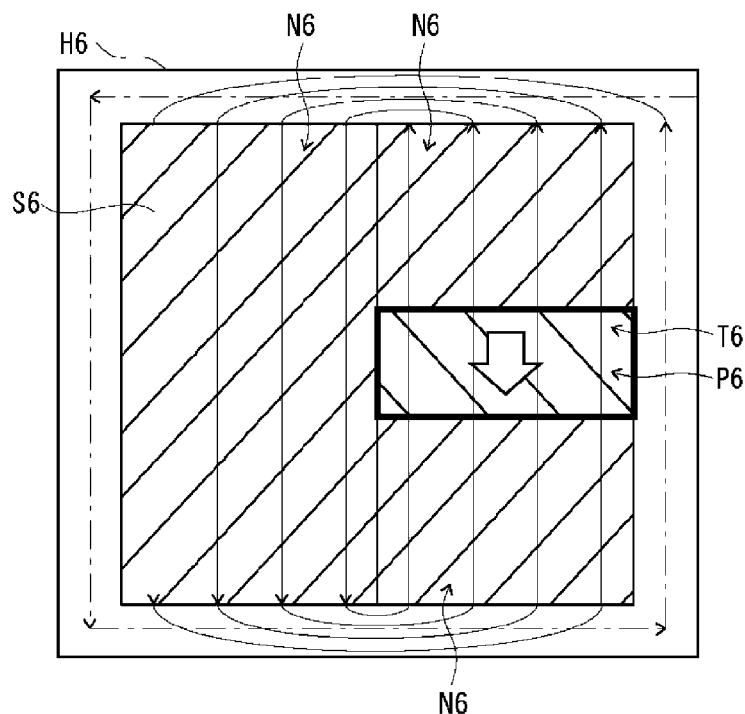
FIG. 24 is a plan view illustrating another example of the field of the first example of the combine harvester according to the embodiment of the present invention by dividing the lodging influence region into the unidirectional reaping corresponding region and the unidirectional reaping unnecessary region.

Alternatively, in a field H6 of the example illustrated in FIG. 23, the normal region is arranged in front of and behind a lodging region T6, and the length of the normal region in the row direction is relatively long. Also in the field H6, the travel route creation section 62 sets a travel route S6 based on the field information, and sets a unidirectional reaping corresponding region P6 and a unidirectional reaping unnecessary region N6. The travel route creation section 62 can set the independent travel route S6, with high work efficiency, for both the front and rear normal regions respectively in front of and behind the lodging region T6. Therefore, as illustrated in FIG. 24, the travel route creation section 62 corrects the unidirectional reaping corresponding region P6 set initially, and sets the unidirectional reaping unnecessary region N6 in the front and rear normal regions. Then, as illustrated in FIG. 25, the travel route S6 of the unidirectional reaping is set for the unidirectional reaping corresponding region P6 including the lodging region T6, and the travel route S6 independent of the lodging region T6 is set for each of the unidirectional reaping unnecessary regions N6 including the front and rear normal regions.

Figure 25:
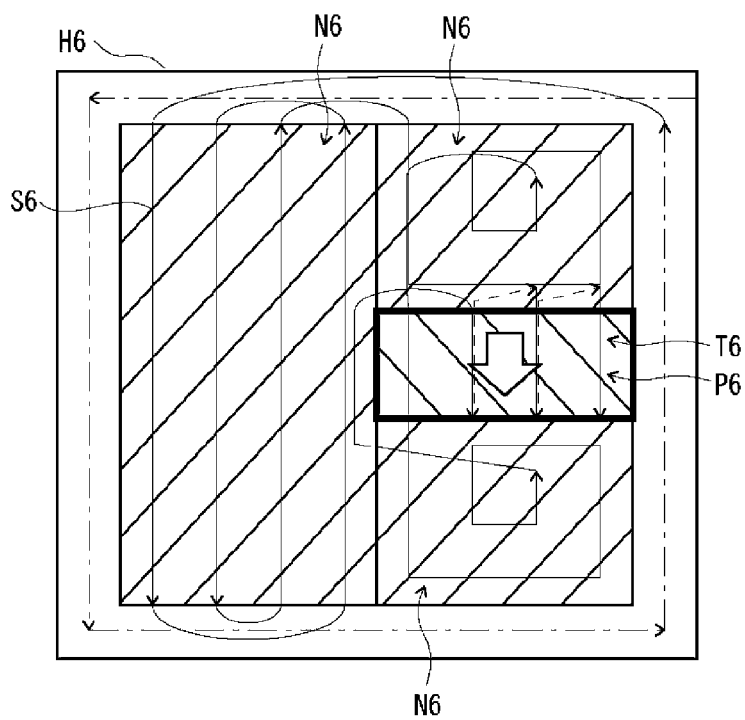
FIG. 25 is a plan view illustrating another example of the field of the first example of the combine harvester according to the embodiment of the present invention together with the corrected travel route.

Note that, in the example illustrated in FIG. 25, reaping is performed in the order of the rear normal region, the front normal region, and the lodging region T6, but in another example, reaping may be performed in the order of the rear normal region, the lodging region T6, and the front normal region according to the row direction. In addition, in the example illustrated in FIG. 25, the whirl reaping is set for each normal region, but the round-trip reaping may be set.

In the first example, when the travel route creation section 62 creates and corrects the travel route S1, S2, S4, S5, or S6, the automatic driving control section 63 controls the traveling section 2 and the reaping section 3 according to the travel route S1, S2, S4, S5, or S6, and executes automatic travel and automatic reaping on an unreaped grain culm region of the field H1, H2, H4, H5, or H6.

Note that, in the first example described above, an example has been described in which, when the travel route S1, S2, S4, S5, or S6 is created in advance, the lodging information is set by the lodging information setting section 61 and the travel route S1, S2, S4, S5, or S6 is corrected based on the lodging information. However, the timing of setting the lodging information and the timing of creating or correcting the travel route S1, S2, S4, S5, or S6 based on the lodging information are not limited to this example in the present invention. For example, the lodging information setting section 61 may set the lodging information when the lodging region T1, T2, T4, T5, or T6 is detected during the execution of the automatic travel and the automatic reaping.

In this case, the travel route creation section 62 may correct the travel route S1, S2, S4, S5, or S6 based on the lodging information during the execution of the automatic travel and the automatic reaping. Before the combine harvester 1 reaches the lodging region T1, T2, T4, T5, or T6, the travel route creation section 62 may correct the travel route S1, S2, S4, S5, or S6 while executing automatic driving, or may temporarily stop automatic driving and correct the travel route S1, S2, S4, S5, or S6.

Alternatively, the lodging information setting section 61 may set the lodging information when the lodging region T1, T2, T4, T5, or T6 is detected before the travel route creation section 62 creates the travel route S1, S2, S4, S5, or S6 in advance. In this case, the travel route creation section 62 may create in advance the travel route S1, S2, S4, S5, or S6 to perform the unidirectional reaping in the lodging region T1, T2, T4, T5, or T6 based on the field information and the lodging information.

Note that, in the first example described above, as correction of the travel route S1, S2, S4, S5, or S6 in the unidirectional reaping corresponding region P1, P2, P4, P5, or P6, an example has been described in which the unidirectional reaping is performed from the start position to the finish position of the unidirectional reaping corresponding route, and then backward movement is performed from the finish position to the start position, and the reaping is shifted to the unidirectional reaping in another adjacent unidirectional reaping corresponding route. However, in the present invention, the travel route S1, S2, S4, S5, or S6 in the unidirectional reaping corresponding region P1, P2, P4, P5, or P6 is not limited to this example. For example, in a case where the unidirectional reaping corresponding region P1, P2, P4, P5, or P6 and the unidirectional reaping unnecessary region N1, N2, N4, N5, or N6 are arranged in the arrangement direction of the rows, the travel route creation section 62 may correct the travel route S1, S2, S4, S5, or S6 to set each unidirectional reaping corresponding route in the unidirectional reaping corresponding region P1, P2, P4, P5, or P6, as the forward route of the unidirectional reaping, and to set the return route corresponding to the forward route, as the unidirectional reaping unnecessary region N1, N2, N4, N5, or N6. As a result, reaping is alternately performed in the unidirectional reaping corresponding region P1, P2, P4, P5, or P6 and the unidirectional reaping unnecessary region N1, N2, N4, N5, or N6, and the idle running distance of the backward movement can be omitted.

Figure 26:
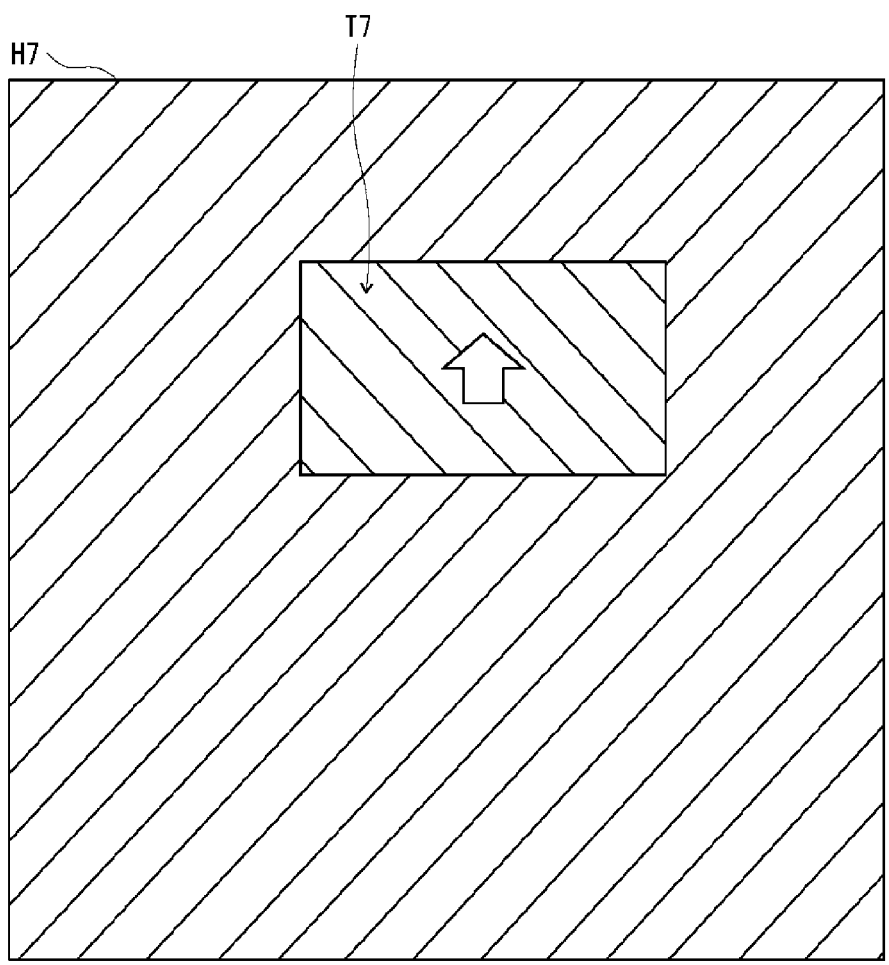
FIG. 26 is a plan view illustrating a field of a second example of the combine harvester according to the embodiment of the present invention together with the lodging region.
Figure 27:
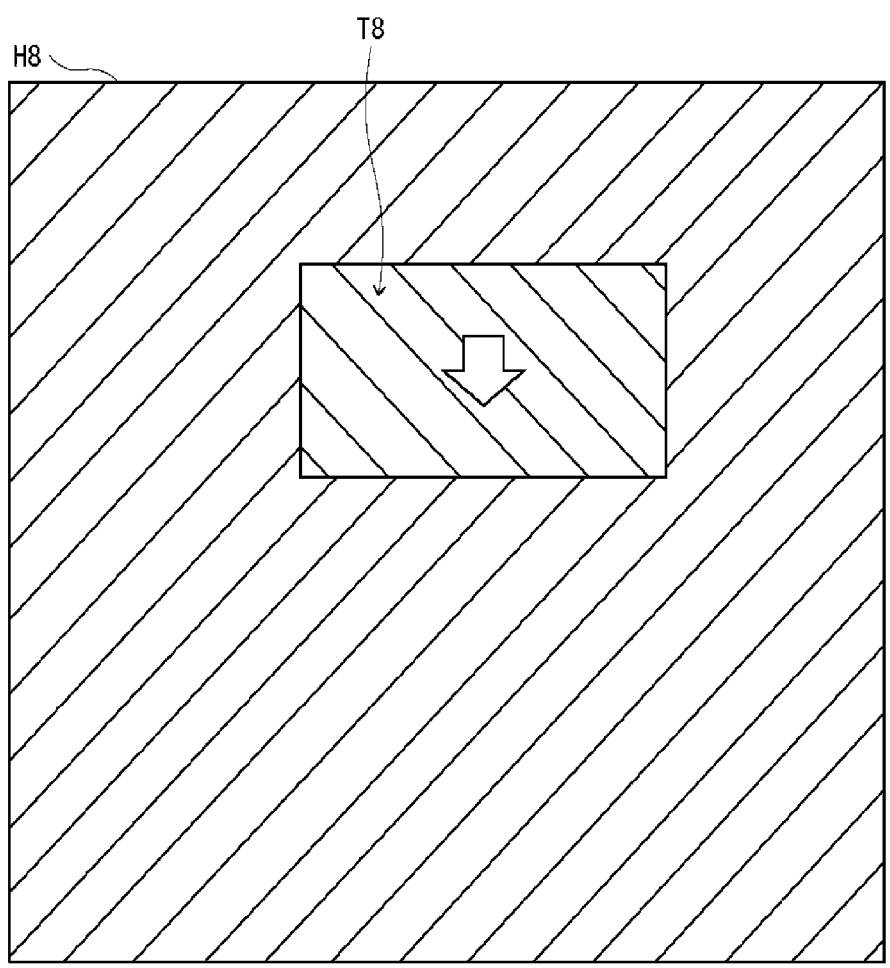
FIG. 27 is a plan view illustrating a field of a third example of the combine harvester according to the embodiment of the present invention together with the lodging region.

Next, an example in which the travel route creation section 62 creates a travel route of the whirl reaping travel in advance and then corrects the travel route based on the lodging information will be described as a second example and a third example. Note that, in the second example and the third example, as illustrated in FIGS. 26 and 27, fields H7 and H8 formed in a rectangular shape and including rice plants, wheats, and the like as crops are set as work targets, and the longitudinal direction in the plane of paper of FIGS. 26 and 27 is the row direction of the grain culms in the fields H7 and H8.

In the second example and the third example, first, the combine harvester 1 automatically or manually sets the field shape, the position information of the field end, the row direction of the grain culms, and the like as the field information of the fields H7 and H8, by the field information setting section 60. In addition, in the second example and the third example, before the travel route creation section 62 creates the travel route in advance, the lodging information setting section 61 automatically sets the lodging information in a case where the lodging region is detected based on the field image of the machine body camera 32, the fixed camera 43, the mobile camera 54, or the aerial imaging camera 57, or the lodging information setting section 61 manually sets the lodging information according to the input operation of the mobile terminal 53 in a case where the lodging region is detected by visual recognition by the worker. In the second example and the third example, as illustrated in FIGS. 26 and 27, the lodging information setting section 61 sets lodging information of the lodging regions T7 and T8 lodged in opposite directions. Note that the lodging information setting section 61 may automatically or manually set the lodging information while the automatic travel and the automatic reaping of the whirl reaping travel are executed.

Figure 28:
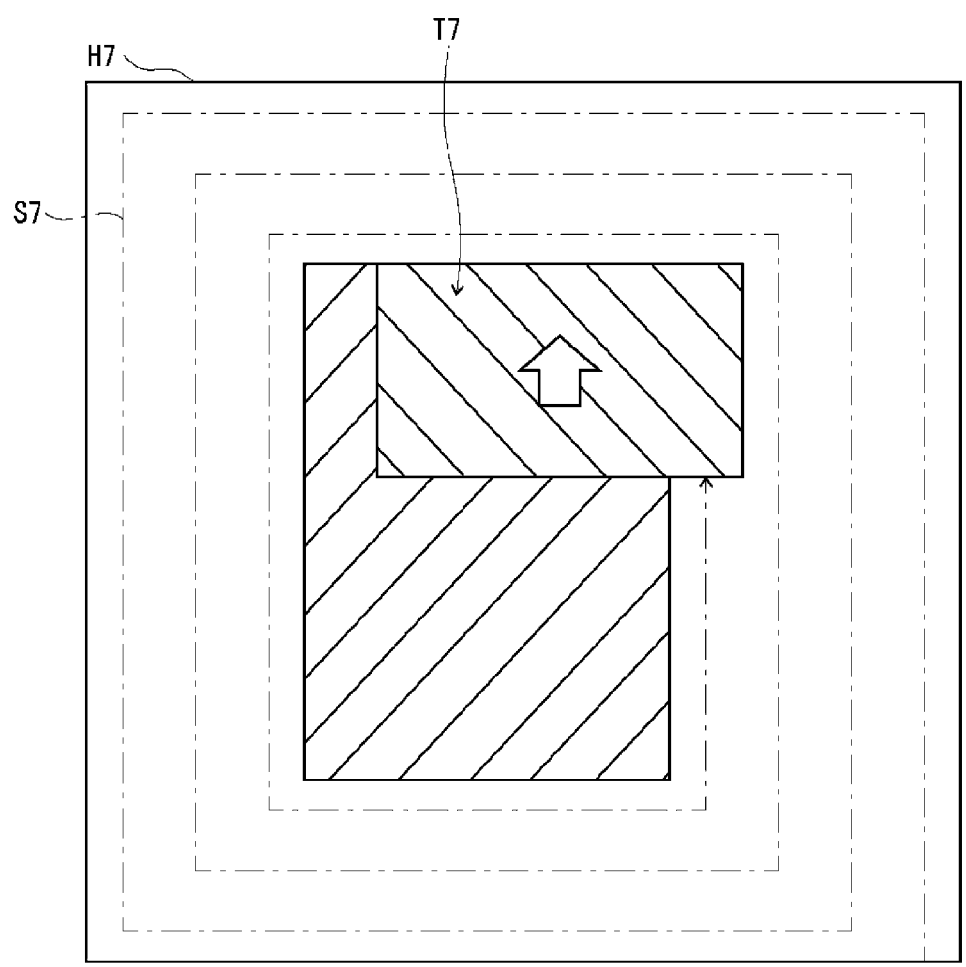
FIG. 28 is a plan view illustrating the field of the second example of the combine harvester according to the embodiment of the present invention together with the lodging region and the travel route.
Figure 29:
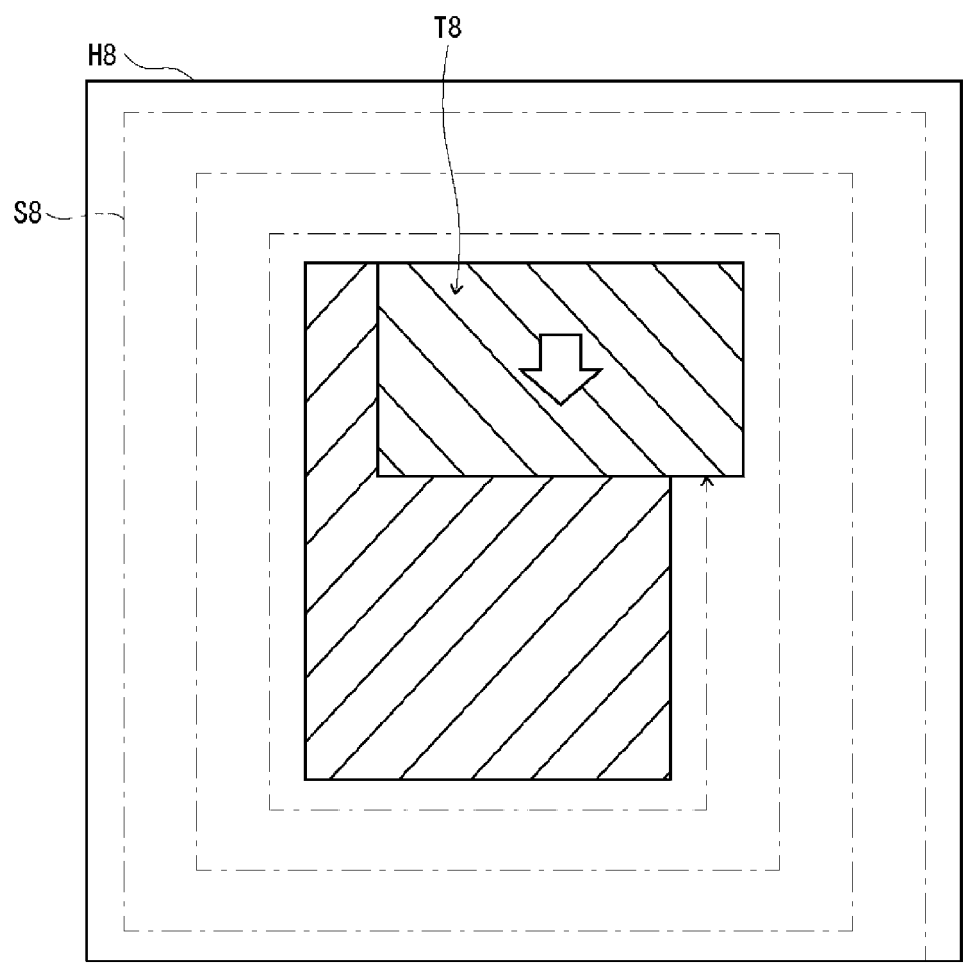
FIG. 29 is a plan view illustrating the field of the third example of the combine harvester according to the embodiment of the present invention together with the lodging region and the travel route.

Next, as illustrated in FIGS. 28 and 29, the travel route creation section 62 creates, in advance, travel routes S7 and S8 for automatic travel and automatic reaping in the fields H7 and H8 by the whirl reaping travel based on the field information, and stores the travel routes S7 and S8 in the storage section 51. As the whirl reaping travel, the travel route creation section 62 creates the spiral travel routes S7 and S8 in which circling is started along the field end, circling is repeated toward the center side of the fields H7 and H8, and reaping is repeated along the outer periphery of the unreaped grain culm region. The travel routes S7 and S8 of the whirl reaping travel are configured by connecting a plurality of straight line routes while changing the movement direction. The travel route creation section 62 may set the round direction of the whirl reaping travel to circle in the fields while arranging the side of the driver's seat 29 outside the fields H7 and H8. In the second example and the third example, since the driver's seat 29 is provided on the right side, examples of the travel routes S7 and S8 circling counterclockwise will be described.

Alternatively, the travel route creation section 62 may determine the unreaped grain culm region while traveling and create the travel routes S7 and S8 along the outer periphery of the unreaped grain culm region, without creating the travel routes S7 and S8 in the entire field in advance. As the automatic driving progresses, the shape of the unreaped grain culm region changes, and therefore, the travel route creation section 62 re-determines the unreaped grain culm region at predetermined intervals of, for example, time and distance of the automatic driving and re-creates (updates) the travel routes S7 and S8 along the unreaped grain culm region.

When the travel routes S7 and S8 of the whirl reaping travel are created by the travel route creation section 62, the automatic driving control section 63 controls the traveling section 2 and the reaping section 3 in accordance with the travel routes S7 and S8, and executes automatic travel and automatic reaping for the whirl reaping travel in the unreaped grain culm region of the fields H7 and H8.

In the second example and the third example, the lodging regions T7 and T8 having the same lodging region shape are detected with the fields having the same field shape as the work target. In the second example illustrated in FIG. 28, the movement direction when the travel route S7 created in advance reaches the lodging region T7 is the same as the lodging direction of the grain culms in the lodging region T7. In the third example illustrated in FIG. 29, the movement direction when the travel route S8 created in advance reaches the lodging region T8 is opposite to the lodging direction of the grain culms in the lodging region T8. The travel route creation section 62 corrects the travel routes S7 and S8 of the whirl reaping travel based on the lodging information set by the lodging information setting section 61.

Figure 30:
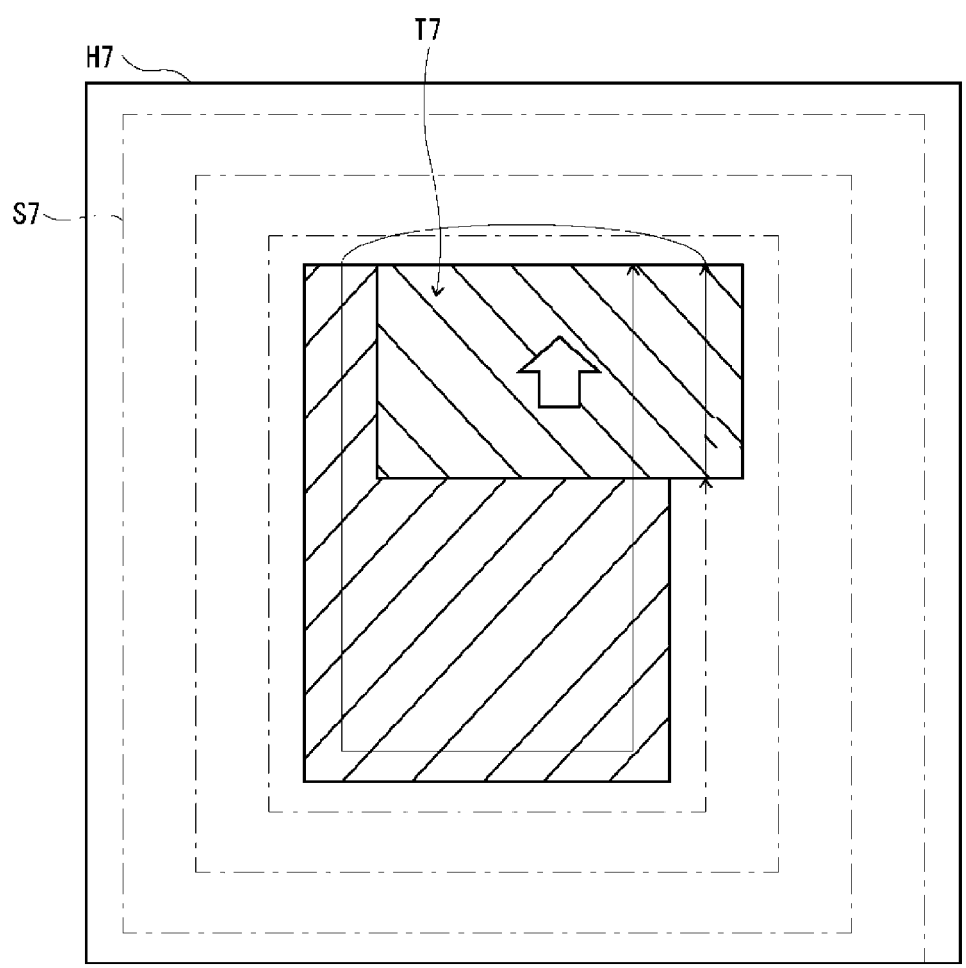
FIG. 30 is a plan view illustrating the field of the second example of the combine harvester according to the embodiment of the present invention together with the lodging region and the corrected travel route.

First, an operation of correcting the travel route S7 of the whirl reaping travel in the second example will be described. The travel route creation section 62 compares the movement direction of the straight line route, on which traveling is currently being performed, on the travel route S7 with the lodging direction of the lodging region T7 on the movement direction side, and determines whether or not the travel route S7 should be corrected based on the comparison result. In the case of the second example in which the lodging direction of the lodging region T7 is the same as the movement direction, as illustrated in FIG. 30, the travel route creation section 62 maintains the travel setting of the travel route S7 without correcting the travel setting until the movement direction is changed, and accordingly, the following reaping can be performed in the lodging region T7. Even in a case where the travel setting of the lodging region T7 is not corrected, the travel route creation section 62 corrects the work setting of the lodging region T7 to the work setting specific to the lodged grain culms.

When the travel route S7 of the whirl reaping travel changes the movement direction from the current straight line route to another straight line route, the travel route creation section 62 compares the lodging direction of the lodging region T7 with the changed movement direction, and determines whether or not the travel route S7 should be corrected based on the comparison result. In the case of the second example in which the lodging direction of the lodging region T7 is different from the changed movement direction, the travel route creation section 62 corrects the travel route S7 based on the field information of the unreaped grain culm region and the lodging information of the lodging region T7.

Figure 31:
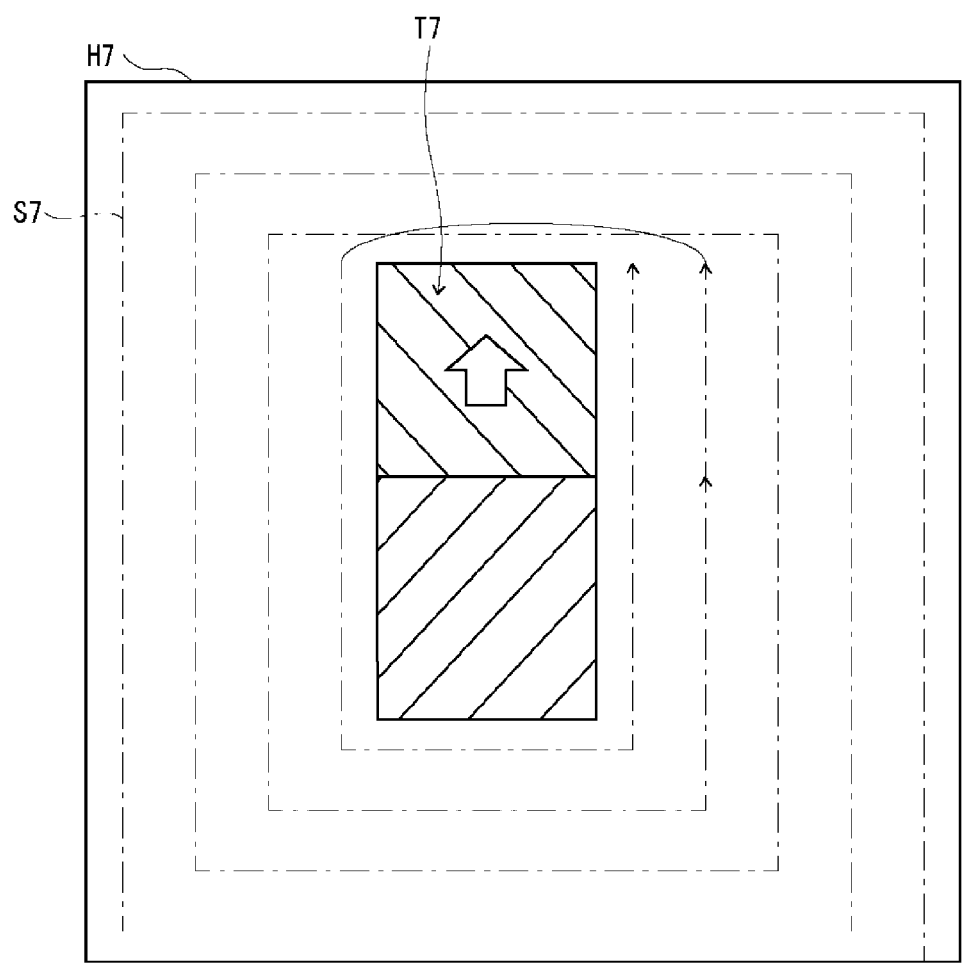
FIG. 31 is a plan view illustrating the field of the second example of the combine harvester according to the embodiment of the present invention together with the lodging region and the corrected travel route.

At this time, the travel route creation section 62 may set the unidirectional reaping corresponding route and the unidirectional reaping corresponding region for a row passing through the lodging region T7, and set the unidirectional reaping unnecessary route and the unidirectional reaping unnecessary region for a row not passing through the lodging region T7, similarly to the correction of the round-trip reaping travel. As illustrated in FIG. 30, the travel route creation section 62 bypasses the lodging region T7 and shifts to the unidirectional reaping unnecessary region, and as illustrated in FIG. 31, the automatic driving control section 63 controls the traveling section 2 and the reaping section 3 according to the travel route S7 of the unidirectional reaping unnecessary region to execute automatic travel and automatic reaping for the unidirectional reaping unnecessary region.

Figure 32:
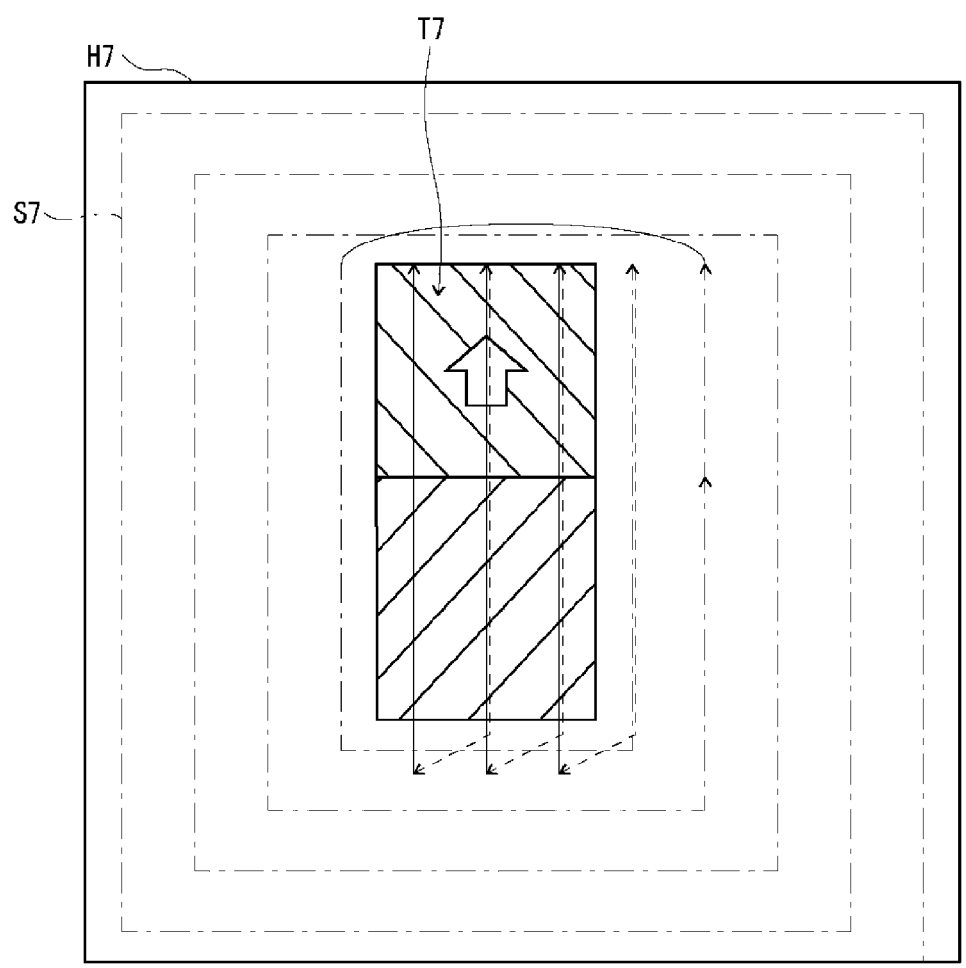
FIG. 32 is a plan view illustrating the field of the second example of the combine harvester according to the embodiment of the present invention together with the lodging region and a further corrected travel route.

The travel route creation section 62 corrects the travel route S7 to shift to the unidirectional reaping corresponding region after the completion of reaping of the unidirectional reaping unnecessary region. In the second example, as illustrated in FIG. 32, for the unidirectional reaping corresponding region, the travel route creation section 62 corrects the travel route S7 to start automatic reaping from a unidirectional reaping corresponding route on one end side in the arrangement direction of the rows, perform the unidirectional reaping from a start position to a finish position of the unidirectional reaping corresponding route, then move backward from the finish position to the start position, and shift to the unidirectional reaping of another adjacent unidirectional reaping corresponding route. In addition, the travel route creation section 62 corrects the work setting of the lodging region T7 to the work setting specific to the lodged grain culms for the unidirectional reaping corresponding route.

Next, an operation of correcting the travel route S8 of the whirl reaping travel in the third example will be described. The travel route creation section 62 compares the movement direction of the straight line route, on which traveling is currently being performed, on the travel route S8 with the lodging direction of the lodging region T8 on the movement direction side, and determines whether or not the travel route S8 should be corrected based on the comparison result. In the case of the third example in which the lodging direction of the lodging region T8 is different from the movement direction, the travel route creation section 62 corrects the travel route S8 before reaching the lodging region T8.

Figure 33:
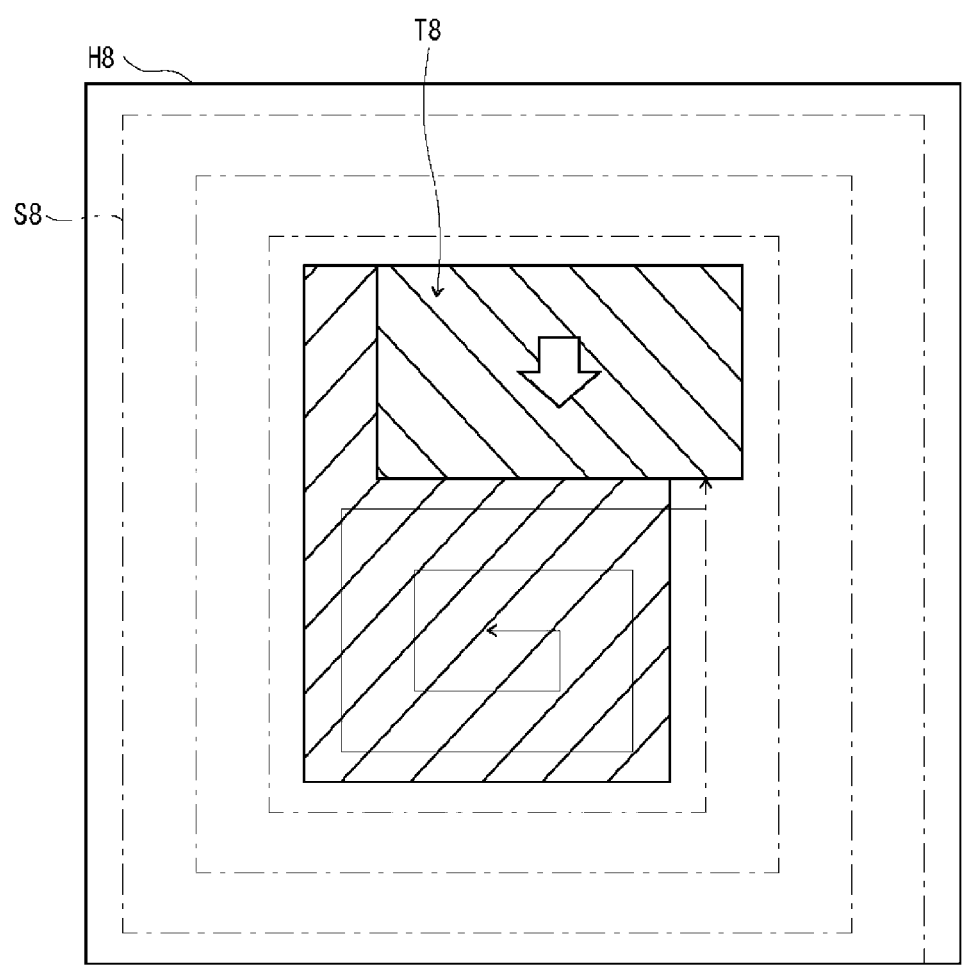
FIG. 33 is a plan view illustrating the field of the third example of the combine harvester according to the embodiment of the present invention together with the lodging region and the corrected travel route.

In this case, as shown in FIG. 33, since the current position of the combine harvester 1 is on the side of the lodging direction with respect to the lodging region T8, it is necessary to go around to the opposite side across the lodging region T8 from the current position in order to perform the following reaping of the lodging region T8. Therefore, in the third example, since the work efficiency is good if reaping on the current position side is performed before reaping on the lodging region T8 side, the travel route creation section 62 may set the unidirectional reaping corresponding route and the unidirectional reaping corresponding region on the lodging region T8 side in the row direction among the unreaped grain culm region, and may set the unidirectional reaping unnecessary route and the unidirectional reaping unnecessary region on the current position side.

Figure 34:
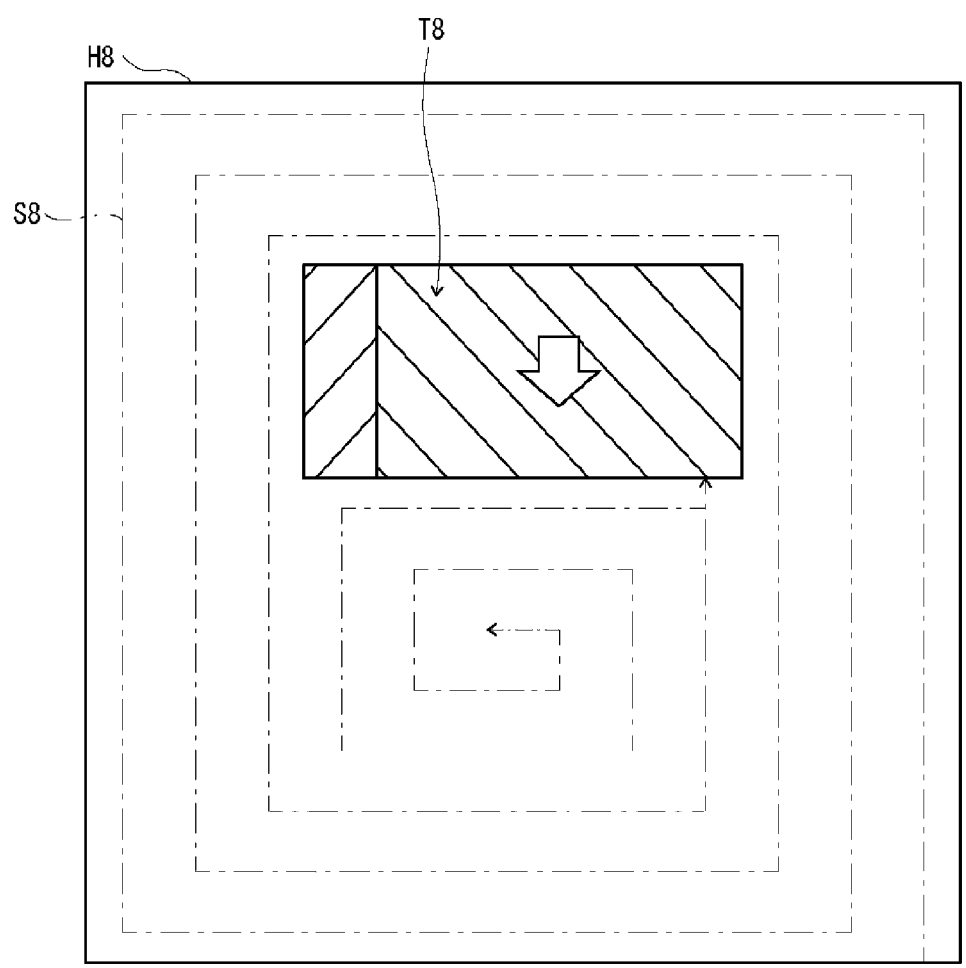
FIG. 34 is a plan view illustrating the field of the third example of the combine harvester according to the embodiment of the present invention together with the lodging region and the corrected travel route.

The travel route creation section 62 corrects the travel route S8 to shift to the unidirectional reaping unnecessary region on the current position side, and to perform the whirl reaping as illustrated in FIG. 33. As illustrated in FIG. 34, the automatic driving control section 63 controls the traveling section 2 and the reaping section 3 according to the travel route S8 of the unidirectional reaping unnecessary region, and executes the automatic travel and the automatic reaping for the unidirectional reaping unnecessary region.

Figure 35:
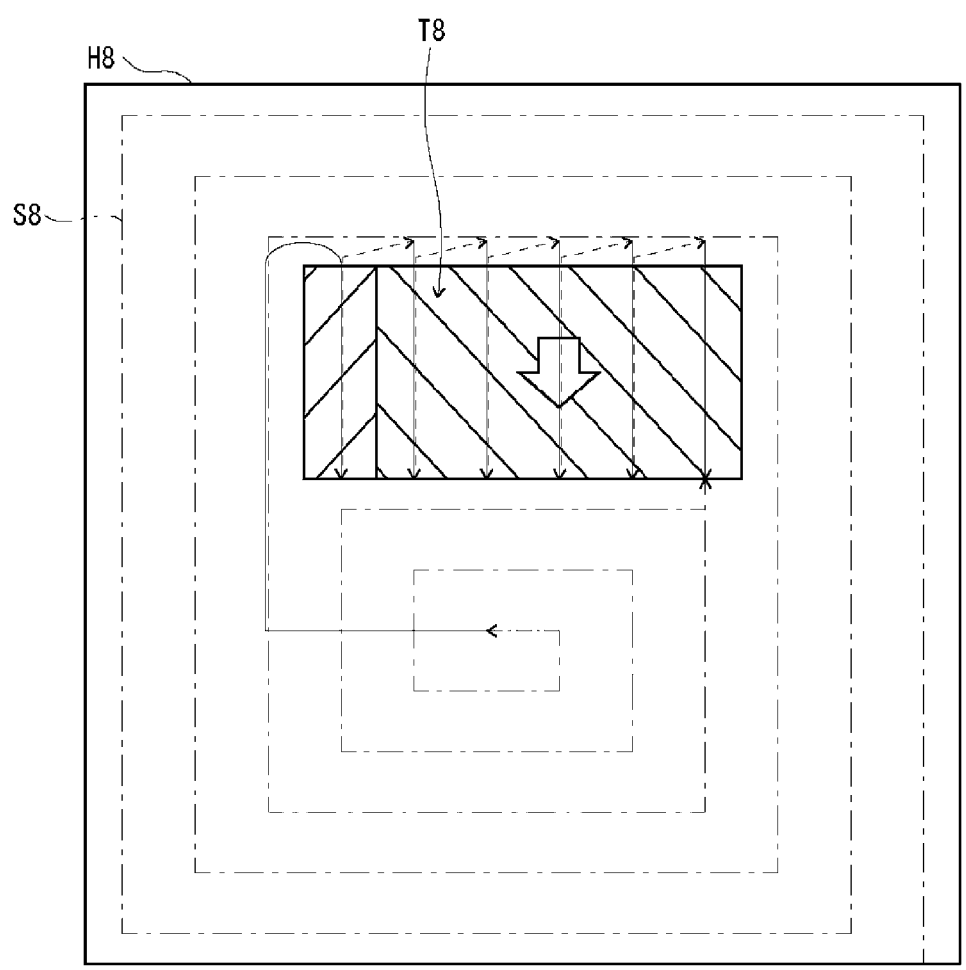
FIG. 35 is a plan view illustrating the field of the third example of the combine harvester according to the embodiment of the present invention together with the lodging region and the further corrected travel route.

The travel route creation section 62 corrects the travel route S8 to shift to the unidirectional reaping unnecessary region after the completion of reaping of the unidirectional reaping unnecessary region. In the third example, as illustrated in FIG. 35, for the unidirectional reaping corresponding region, the travel route creation section 62 corrects the travel route S8 to start the automatic reaping from a unidirectional reaping corresponding route on one end side in the arrangement direction of the rows, perform the unidirectional reaping from a start position to a finish position of the unidirectional reaping corresponding route, then move backward from the finish position to the start position, and shift to the unidirectional reaping on another adjacent unidirectional reaping corresponding route. The travel route creation section 62 corrects the work setting of the lodging region to the work setting specific to the lodged grain culms for the unidirectional reaping corresponding route.

In both of the second example and the third example, when the travel routes S7 and S8 are corrected by the travel route creation section 62, the automatic driving control section 63 controls the traveling section 2 and the reaping section 3 according to the corrected travel routes S7 and S8, and executes the automatic travel and the automatic reaping for the unreaped grain culm region of the fields H7 and H8.

As described above, according to the present embodiment, the combine harvester 1 includes the control device 50, and the control device 50 functions as: the travel route creation section 62 that creates the travel route corresponding to the field; and the automatic driving control section 63 that controls the automatic travel and the automatic reaping according to the travel route. In addition, the control device 50 functions as the lodging information setting section 61 that automatically or manually sets lodging information related to the lodging region where the grain culms are lodged in the field. Then, the travel route creation section 62 creates the travel route including reaping of the grain culms in the lodging region based on the lodging information.

As a result, since the combine harvester 1 creates the travel route for performing reaping suitable for the lodged grain culms in consideration of the lodging state of the crops in the field, it is possible to create the travel route capable of reaping work including the lodged grain culms regardless of the lodging state of the crops. The combine harvester 1 can appropriately perform the automatic driving even in the lodging region by using the travel route created in this manner. Therefore, the worker does not need to reap the lodging region by manual driving, and it is possible to restrain the trouble of switching between the automatic driving and the manual driving and the burden of the manual driving.

Note that the lodging information setting section 61 can set the lodging information not only when the travel route is first created but also during execution of the automatic driving corresponding to the travel route. As a result, it is possible to set the lodging information after approaching the lodging region and more accurately grasping the lodging state, and therefore, it is possible to set more accurate name lodging information. In addition, since the lodging information setting section 61 can automatically set the lodging information in a case where the lodging region is detected based on the field image of the machine body camera 32, the fixed camera 43, the mobile camera 54, or the aerial imaging camera 57, the combine harvester 1 can be automatically driven by unmanned work.

In addition, in the combine harvester 1 of the present embodiment, the lodging information setting section 61 sets the lodging direction of the grain culms as the lodging information, and the travel route creation section 62 creates the travel route to reap the grain culms in the lodging region in a predetermined recommended reaping direction with respect to the lodging direction.

As a result, since the combine harvester 1 sets only the lodging region where the reaping direction is not suitable, as a correction target of the travel route, the travel route can be created and corrected by a relatively simple algorithm. The combine harvester 1 can create the travel route to reap the lodged grain culms in an appropriate reaping direction, and can perform an appropriate reaping operation in the lodging region by automatic driving.

Further, in the combine harvester 1 according to the present embodiment, in a case where the reaping direction corresponding to the travel route in the lodging region is different from the recommended reaping direction based on the travel route and the lodging information, the travel route creation section 62 determines a unidirectional reaping corresponding region including the lodging region, and corrects the travel route in a manner that the reaping direction in the unidirectional reaping corresponding region becomes the recommended reaping direction.

Since the movement direction is limited in the lodging region, the correction of the travel route depends on the position of the lodging region. However, since the combine harvester 1 performs the same correction on the travel route not only in the lodging region but also in the unidirectional reaping corresponding region including the lodging region, the travel route can be corrected while reducing the dependence on the position of the lodging region, and the travel route with high work efficiency can be created.

In addition, in the combine harvester 1 of the present embodiment, the travel route creation section 62 determines, based on the travel route and the lodging information, the lodging influence region in which traveling of the travel route is affected due to correction of the travel route in the unidirectional reaping corresponding region. The travel route creation section 62 divides the lodging influence region into the unidirectional reaping corresponding region and the unidirectional reaping unnecessary region other than the unidirectional reaping corresponding region. Then, based on the position of the lodging region in the unidirectional reaping corresponding region, the travel route creation section 62 further divides a region, not including the lodging region, of the unidirectional reaping corresponding region as a unidirectional reaping unnecessary region.

In the unidirectional reaping corresponding region where the movement direction is limited, an idle running distance may be required, but since the combine harvester 1 can make the unidirectional reaping corresponding region relatively small, the idle running distance can be made relatively short. In addition, in the unidirectional reaping unnecessary region in which the movement direction is not limited, a travel route with high work efficiency can be set, and therefore, the travel route with high work efficiency can be created as a whole.

In addition, in the combine harvester 1, the travel route creation section 62 sets travel setting and work setting specific to the lodged grain culms for the travel route of the lodging region, and for example, sets the travel speed to a low speed and sets the reaping speed to a high speed. As a result, in a case where the combine harvester 1 performs the automatic driving on the travel route created by the travel route creation section 62, the combine harvester 1 automatically performs traveling and reaping suitable for lodged grain culms in the lodging region, and thus, work efficiency can be improved without depending on a skilled operation of the worker in automatic work. In addition, even in a case where the combine harvester 1 is automatically driven in an unmanned work, an appropriate operation can be performed in the lodging region.

Further, in the combine harvester 1, the travel route creation section 62 sets the travel speed and the reaping speed according to the lodging angle of the grain culms for the travel route of the lodging region. As a result, reaping is performed appropriately according to the lodging state of the grain culms, and therefore, the work efficiency can be further improved.

In the embodiment described above, an example of the combine harvester 1 including a head-feeding combine harvester has been described, but the present invention is not limited to this example, and the combine harvester 1 may include a normal combine harvester. In addition, in the above-described embodiment, the example in which the recommended reaping direction is set to correspond to the following reaping has been described, but the present invention is not limited to this example, and the recommended reaping direction may be set to other reaping directions such as the left lodging reaping, the right lodging reaping, and the facing reaping according to the type of crops and the lodging state of the grain culms.

The present invention can be appropriately modified without departing from the gist or idea of the invention that can be read from the claims and the entire specification, and a combine harvester with such a modification is also included in the technical idea of the present invention.

LIST OF REFERENCE SIGNS

1 Combine harvester
2 Traveling section
3 Reaping section
32 Machine body camera
34 Mobile station
39 Base station
43 Fixed camera
50 Control device
52 Communication section
53 Mobile terminal
54 Mobile camera
57 Aerial imaging camera
60 Field information setting section
61 Lodging information setting section
62 Travel route creation section
63 Automatic driving control section

The invention claimed is:

1. A combine harvester comprising:
a lodging information setting section that automatically or manually sets lodging information related to a lodging region where a grain culm is lodged in a field;
a travel route creation section that
creates, based on the lodging information, an initial travel route corresponding to the field, the travel route including reaping of the grain culm in the lodging region,
determines a lodging influence region in which traveling on the initial travel route is affected based on the first travel route and the lodging information, wherein the lodging influence region is divided into a unidirectional reaping corresponding region and a unidirectional reaping unnecessary region that is part of the unidirectional reaping corresponding region and does not include the lodging region, and
corrects the initial travel route so that a reaping direction in the unidirectional reaping corresponding region is set as a recommended reaping direction for the unidirectional reaping corresponding region; and
an automatic driving control section that controls automatic travel and automatic reaping according to the corrected travel route.

2. The combine harvester according to claim 1, wherein the lodging information setting section sets a lodging direction of the grain culm as the lodging information, and
the travel route creation section creates the initial travel route to reap the grain culm in the lodging region in a predetermined recommended reaping direction with respect to the lodging direction.

3. The combine harvester according to claim 2, wherein the travel route creation section corrects the initial travel route in response to a determination that
the reaping direction corresponding to the initial travel route in the lodging region is different from the recommended reaping direction.

4. The combine harvester according to claim 1, wherein the unidirectional reaping unnecessary region is determined based on a position of the lodging region in the unidirectional reaping corresponding region.

5. The combine harvester according to claim 1, further comprising:
a field information setting section that automatically sets field information related to the field based on a field image in which an image of the field has been captured, wherein the lodging information setting section automatically sets the lodging information based on the field image.

* * * * *